United States Patent
Kim et al.

(10) Patent No.: US 11,489,632 B2
(45) Date of Patent: Nov. 1, 2022

(54) METHOD FOR SUPPORTING HARQ PROCESS IN WIRELESS LAN SYSTEM AND WIRELESS TERMINAL USING SAME

(71) Applicant: LG ELECTRONICS INC., Seoul (KR)

(72) Inventors: Jeongki Kim, Seoul (KR); Kiseon Ryu, Seoul (KR); Jinyoung Chun, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 15 days.

(21) Appl. No.: 16/980,353

(22) PCT Filed: Mar. 25, 2019

(86) PCT No.: PCT/KR2019/003421
§ 371 (c)(1),
(2) Date: Sep. 11, 2020

(87) PCT Pub. No.: WO2019/182421
PCT Pub. Date: Sep. 26, 2019

(65) Prior Publication Data
US 2021/0044389 A1 Feb. 11, 2021

(30) Foreign Application Priority Data
Mar. 23, 2018 (KR) .......................... 10-2018-0034155

(51) Int. Cl.
*H04L 1/18* (2006.01)
*H04L 5/00* (2006.01)
(Continued)

(52) U.S. Cl.
CPC .......... *H04L 1/1819* (2013.01); *H04L 5/0055* (2013.01); *H04W 12/06* (2013.01); *H04W 84/12* (2013.01)

(58) Field of Classification Search
CPC ....... H04L 1/00; H04L 1/1607; H04L 1/1692; H04L 1/1819; H04L 27/26; H04L 5/0055; H04W 12/06; H04W 48/16; H04W 84/12
See application file for complete search history.

(56) References Cited

U.S. PATENT DOCUMENTS

| 10,405,265 B1* | 9/2019 | Chu .................. H04W 74/0808 |
| 2006/0056421 A1* | 3/2006 | Zaki ...................... H04L 1/1664 370/428 |

(Continued)

FOREIGN PATENT DOCUMENTS

| KR | 20150038007 | 4/2015 |
| WO | 2011/136554 | 11/2011 |

(Continued)

OTHER PUBLICATIONS

PCT International Application No. PCT/KR2019/003421, International Search Report dated Jun. 27, 2019, 2 pages.

*Primary Examiner* — Michael J Moore, Jr.
*Assistant Examiner* — Hicham B Foud
(74) *Attorney, Agent, or Firm* — Lee Hong Degerman Kang Waimey

(57) ABSTRACT

A method for providing ACK and/or NACK information in a WLAN system is proposed. The method proposes configuring a second PPDU in response to receiving a first PPDU. The second PPDU includes a legacy part, a control signal field, and a training field. The training field of the second PPDU may be configured based on whether the data field of the first PPDU is successfully received. The training field may be configured based on a first LTF sequence for indicating a successful reception of the first PPDU. The training field may be configured based on a second LTF sequence for indicating an error of the first PPDU.

14 Claims, 29 Drawing Sheets

(51) Int. Cl.
*H04W 12/06* (2021.01)
*H04W 84/12* (2009.01)

(56) References Cited

U.S. PATENT DOCUMENTS

| | | | | |
|---|---|---|---|---|
| 2006/0153152 | A1* | 7/2006 | Kondylis | H04W 74/0816 370/338 |
| 2009/0323564 | A1* | 12/2009 | Chiu | H04L 1/1812 370/280 |
| 2011/0305176 | A1* | 12/2011 | Wentink | H04L 1/1621 370/310 |
| 2012/0314696 | A1* | 12/2012 | Liu | H04W 28/065 370/338 |
| 2013/0155952 | A1* | 6/2013 | Chu | H04L 45/74 370/328 |
| 2014/0293868 | A1* | 10/2014 | Levanen | H04L 1/1896 370/328 |
| 2014/0314004 | A1* | 10/2014 | Zhou | H04L 5/0007 370/329 |
| 2015/0098438 | A1* | 4/2015 | Nammi | H04W 24/10 370/330 |
| 2015/0358067 | A1* | 12/2015 | Zhang | H04W 40/244 370/315 |
| 2016/0080115 | A1* | 3/2016 | Josiam | H04L 1/1854 370/329 |
| 2016/0128092 | A1* | 5/2016 | Azarian Yazdi | H04L 1/1861 370/329 |
| 2016/0374009 | A1* | 12/2016 | Hiertz | H04W 48/16 |
| 2017/0055281 | A1* | 2/2017 | Islam | H04W 72/1289 |
| 2017/0170931 | A1 | 6/2017 | Kusashima et al. | |
| 2017/0230149 | A1* | 8/2017 | Wang | H04L 1/1664 |
| 2021/0044389 | A1* | 2/2021 | Kim | H04L 1/1692 |
| 2021/0099253 | A1* | 4/2021 | Kim | H04B 7/0417 |

FOREIGN PATENT DOCUMENTS

| | | |
|---|---|---|
| WO | 2015/137591 | 9/2015 |
| WO | 2017/193890 | 11/2017 |

* cited by examiner

--PRIOR ART--

--PRIOR ART--

| L-STF | L-LTF | L-SIG | RL-SIG | HE-SIG A | HE-STF | HE-LTF | ... | HE-LTF | Data | PE |

8μs | 8μs | 4μs | 4μs | 8μs | 4μs

Variable durations per HE-LTF symbol

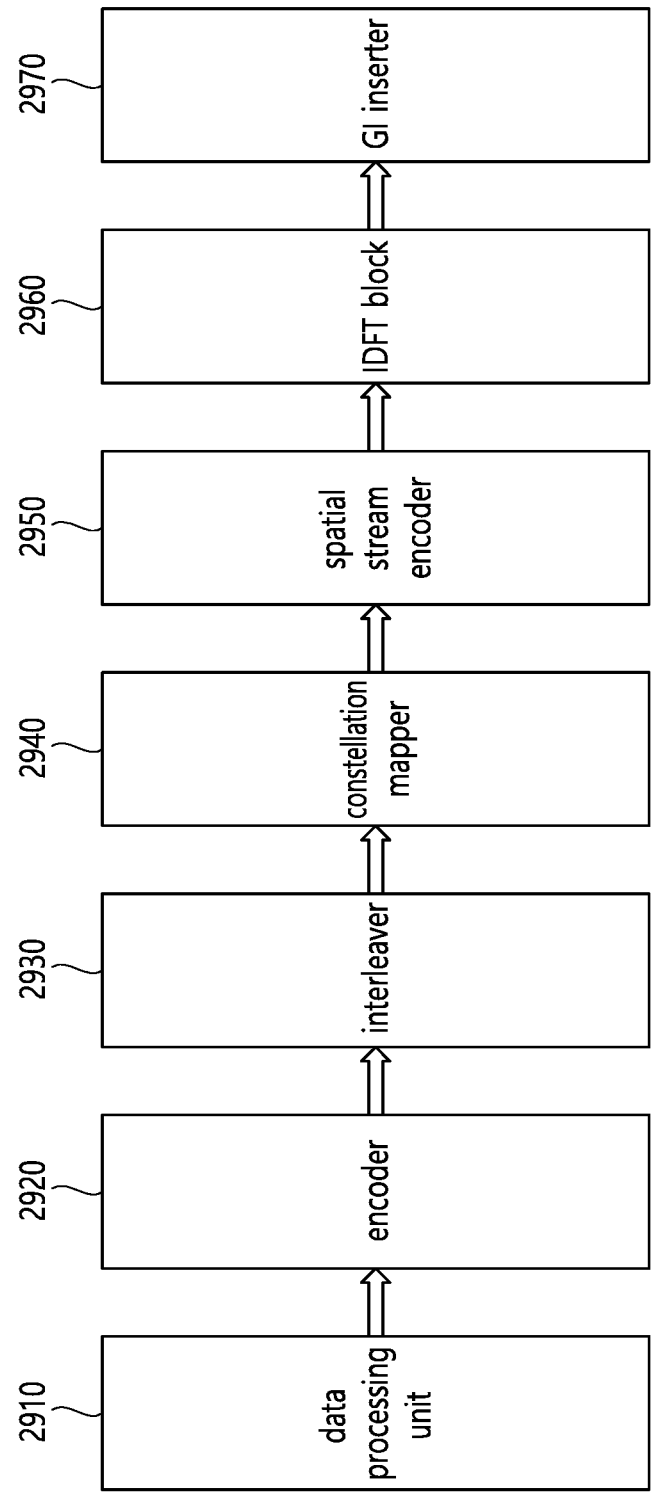

METHOD FOR SUPPORTING HARQ PROCESS IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2019/003421, filed on Mar. 25, 2019, which claims the benefit of earlier filing date and right of priority to Korean Application No. 10-2018-0034155, filed on Mar. 23, 2018, the contents of which are all hereby incorporated by reference herein in their entirety.

BACKGROUND

Technical Field

The present disclosure relates to wireless communication and, more particularly, to a method for supporting an HARQ process in a wireless local area network system and a wireless terminal using the same.

Related Art

There is an ongoing discussion about next-generation wireless local area networks (WLANs). A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in an existing WLAN.

Specifically, scenarios for a wireless office, a smart home, a stadium, a hotspot, a building/apartment, and the like receive attention in the next-generation WLAN. Discussions are ongoing about improvement in performance of a WLAN system in a dense environment including a large number of APs and STAs based on relevant scenarios.

SUMMARY

An aspect of the present disclosure is to provide a method for supporting an HARQ process performed by a first wireless terminal in a wireless local area network (WLAN) system according to an embodiment and a wireless terminal using the same.

A method for supporting an HARQ process performed by a first wireless terminal in a WLAN system according to an embodiment includes: receiving an HARQ PPDU including HARQ data from a second wireless terminal; and transmitting an HARQ feedback frame in response to the HARQ PPDU to the second wireless terminal, wherein the HARQ feedback frame comprises a first field related to a PHY preamble and a second field related to ACK information or NACK information based on whether the HARQ data is successfully received.

According to an embodiment of the present disclosure, there are provided a method for supporting an HARQ process performed by a first wireless terminal with improved performance in a WLAN system and a wireless terminal using the same.

BRIEF DESCRIPTION OF THE DRAWINGS

FIG. 12 to FIG. 15 illustrate HE PPDUs.
FIG. 29 is a block diagram illustrating an example of a device included in a processor.

DESCRIPTION OF EXEMPLARY EMBODIMENTS

The foregoing features and the following detailed description are exemplary contents for helping a description and understanding of the present specification. That is, the present specification is not limited to embodiments and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

Hereinafter, exemplary embodiments of the present disclosure will be described in detail with reference to the appended drawings. A detailed description to be given below with reference to the accompanying drawings is intended to explain exemplary embodiments of the present disclosure rather than illustrating the only embodiments that can be implemented according to the present disclosure.

While the following detailed description includes specific details in order to provide a thorough understanding of the present disclosure, it will be apparent to those skilled in the art that the present disclosure may be practiced without such specific details. In some instances, known structures and devices are omitted or are shown in a block diagram form focusing on important features of the structures and devices so as not to obscure the concept of the present disclosure.

As described above, a method for efficiently using a channel having a wide bandwidth in a WLAN system and a device therefor will be described below. To this end, a WLAN system to which the present disclosure is applied will be described in detail first.

Figure 1:
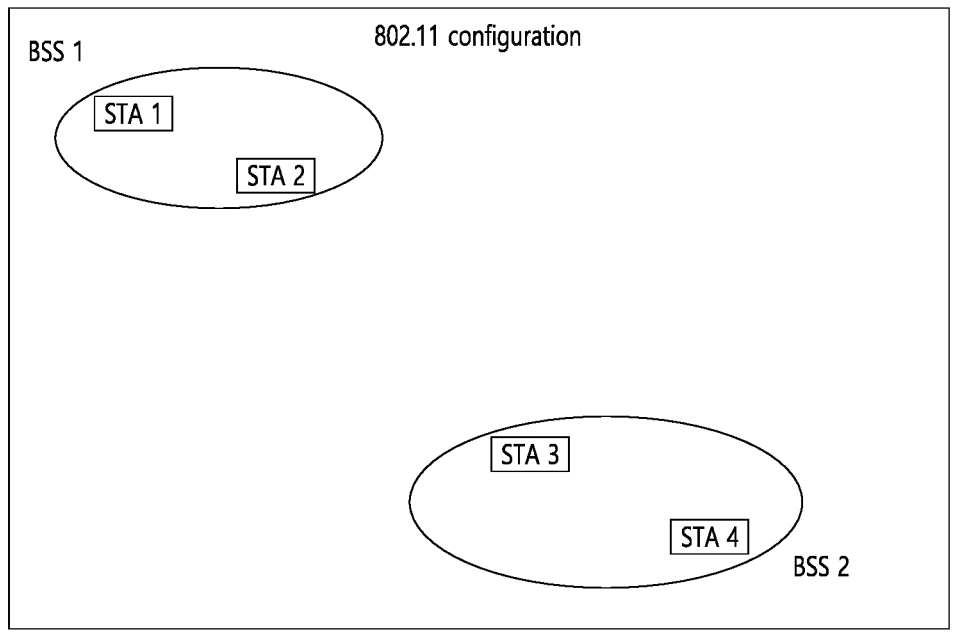
FIG. 1 illustrates an example of the configuration of a WLAN system.

FIG. 1 illustrates an example of the configuration of a WLAN system.

As illustrated in FIG. 1, the WLAN system includes at least one basic service set (BSS). A BSS is a set of stations (STAs) that are capable of communicating with each other by successfully performing synchronization.

A STA is a logical entity including a physical layer interface between a media access control (MAC) layer and a wireless medium and includes an access point (AP) and a non-AP STA. Among STAs, a portable terminal manipulated by a user is a non-AP STA. When a terminal is simply called a STA, the STA refers to a non-AP STA. A non-AP STA may also be referred to as a different term, such as a terminal, a wireless transmit/receive unit (WTRU), a user equipment (UE), a mobile station (MS), a mobile terminal, or a mobile subscriber unit.

An AP is an entity that provides an associated STA with access to a distribution system (DS) through a wireless medium. An AP may also be referred to as a centralized controller, a base station (BS), a node-B, a base transceiver system (BTS), or a site controller.

BSSs may be divided into an infrastructure BSS and an independent BSS (IBSS).

BSSs illustrated in FIG. 1 are IBSSs. An IBSS refers to a BSS that does not include an AP. Since an IBSS does not include an AP, the IBSS does not allow access to a DS and thus forms a self-contained network.

Figure 2:
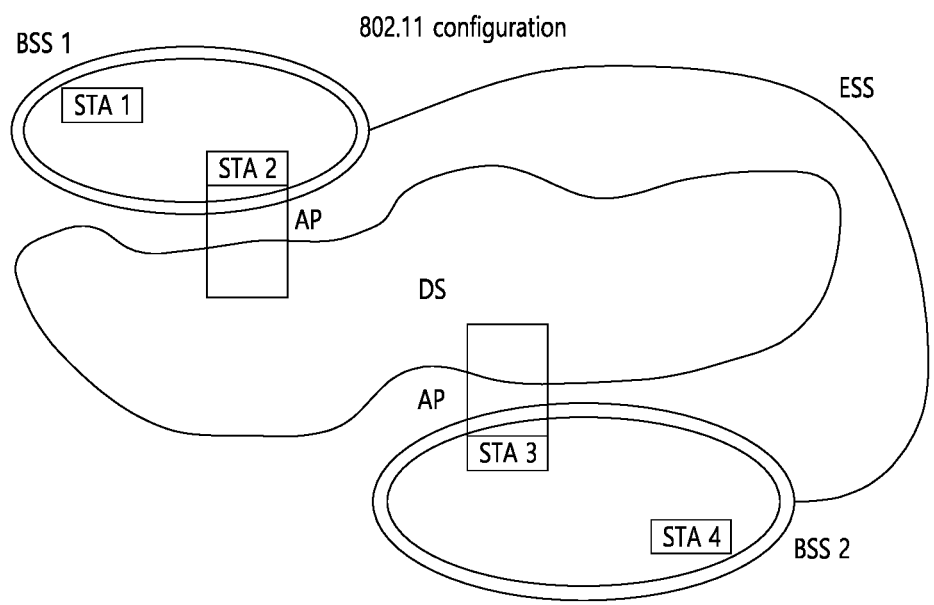
FIG. 2 illustrates another example of the configuration of a WLAN system.

FIG. 2 illustrates another example of the configuration of a WLAN system.

BSSs illustrated in FIG. 2 are infrastructure BSSs. An infrastructure BSS includes one or more STAs and an AP. In the infrastructure BSS, communication between non-AP STAs is basically performed via the AP. However, when a direct link is established between the non-AP STAs, direct communication between the non-AP STAs can be performed.

As illustrated in FIG. 2, a plurality of infrastructure BSSs may be connected to each other via a DS. The BSSs connected via the DS are referred to as an extended service set (ESS). STAs included in the ESS may communicate with each other, and a non-AP STA may move from one BSS to another BSS within the same ESS while seamlessly performing communication.

The DS is a mechanism that connects a plurality of APs to each another and is not necessarily a network. The DS is not limited to any specific form as long as being capable of providing a distribution service. For example, the DS may be a wireless network, such as a mesh network, or may be a physical structure that connects APs to each another.

Layer Structure

The operation of a STA operating in a WLAN system can be described in terms of a layer structure. A layer structure may be implemented by a processor in terms of a device configuration. A STA may have a multi-layer structure. For example, a MAC sublayer and a physical layer (PHY) on a data link layer (DLL) are mainly handled in 802.11. The PHY may include a physical layer convergence procedure (PLCP) entity, a physical medium dependent (PMD) entity, and the like. The MAC sublayer and the PHY conceptually include management entities called a MAC sublayer management entity (MLME) and a physical layer management entity (PLME), respectively. These entities provide a layer management service interface that allows a layer management function to be implemented.

In order to provide an accurate MAC operation, a station management entity (SME) is present within each STA. The SME is a layer-independent entity that can be viewed as residing in a separate management plane or as being off to the side. Exact functions of the SME are not specified in this document, but the SME may be considered to be generally responsible for collecting a layer-dependent status from various layer management entities (LMEs) and similarly setting the values of layer-specific parameters. The SME may generally perform these functions on behalf of general system management entities and may implement standard management protocols.

The aforementioned entities interact in various manners. For example, entities may interact by exchanging GET/SET primitives. A primitive refers to a set of elements or parameters related to a specific purpose. An XX-GET.request primitive is used to request the value of a given MIB attribute (management information-based attribute information). XX-GET.confirm primitive is used to return an appropriate MIB attribute value if status="success," and is used to return an error indication in a Status field otherwise. An XX-SET.request primitive is used to request that an indicated MIB attribute be set to a given value. If the MIB attribute implies a specific action, this primitive requests that the action be performed. An XX-SET.confirm primitive is used to confirm that the indicated MIB attribute has been set to the requested value if status="success," and is used to return an error condition in the Status field otherwise. If the MIB attribute implies a specific action, this primitive confirms that the action has been performed.

The MLME and the SME may exchange various MLME_GET/SET primitives via an MLME_service access point (SAP). Further, various PLME_GET/SET primitives may be exchanged between the PLME and the SME via the PLME_SAP and between the MLME and the PLME via an MLME-PLME_SAP.

Link Setup Process

Figure 3:
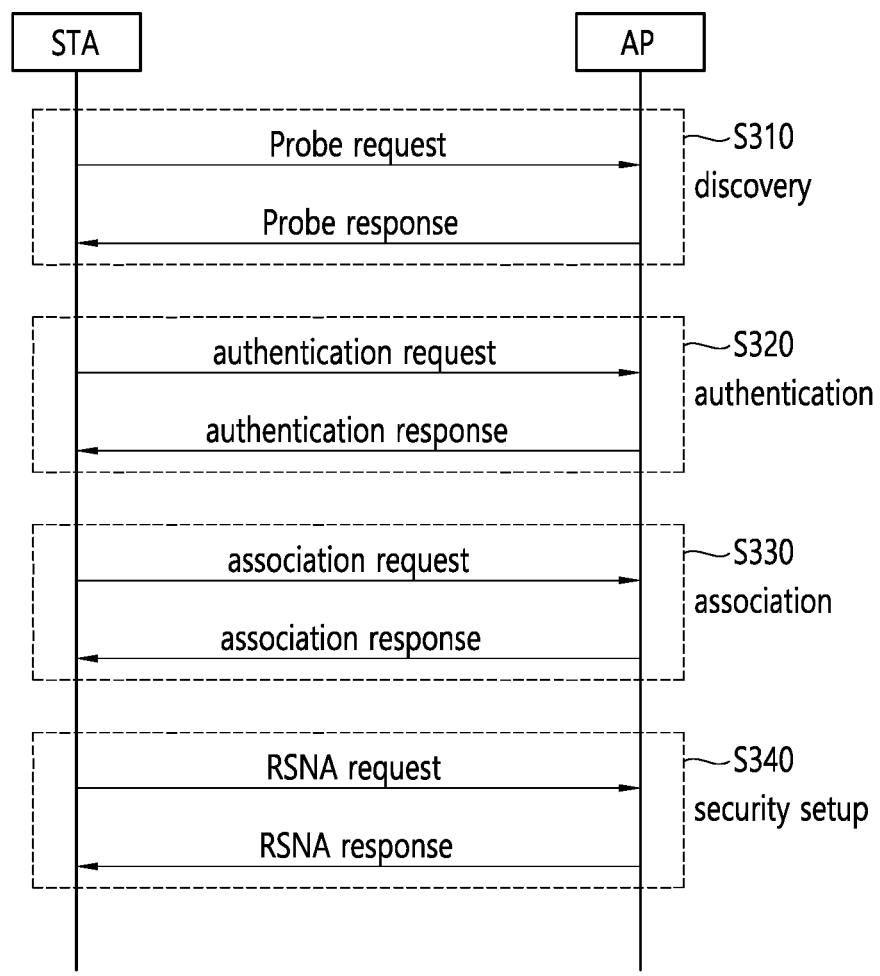
FIG. 3 illustrates a general link setup process.

FIG. 3 illustrates a general link setup process.

To set up a link for a network and transmit/receive data, an STA needs to discover the network, perform authentication, establish association and perform an authentication process for security. A link setup process may also be referred to as a session initiation process or a session setup process. In addition, discovery, authentication, association and security setting of the link setup process may be collectively referred to as an association process.

An exemplary link setup process will be described with reference to FIG. 3.

An ST performs a network discovery operation in step S310. The network discovery operation may include a scanning operation of the STA. That is, in order to access a network, the STA need to discovery networks in which the STA can participate. The STA needs to identify a compatible network before participating in a wireless network. A process of identifying a network present in a specific area is referred to as scanning.

Scanning includes active scanning and passive scanning.

FIG. 3 illustrates an exemplary network discovery operation including active scanning. The STA that performs active scanning transmits a probe request frame in order to scan neighboring APs while moving between channels and waits for a response thereto. A responder transmits a probe response frame in response to the probe request frame to the STA that has transmitted the probe request frame. Here, the responder may be an STA that has transmitted a final beacon frame in a BSS of a channel that is being scanned. In a BSS, an AP is a responder in a BSS because the AP transmits a beacon frame. In an IBSS, a responder is not fixed because STAs in the IBSS transmit beacon frames by turns. For example, an STA that has transmitted a probe request frame on channel #1 and received a probe response frame on channel #1 may store BSS related information included in the received probe response frame, move to the next channel (e.g., channel #2) and perform scanning (i.e., transmission/reception of a probe request/response on channel #2) through the same method.

Although not shown in FIG. 3, passive scanning may be performed as a scanning operation. An STA that performs passive scanning waits for a beacon frame while moving between channels. A beacon frame is a management frame in IEEE 802.11 and is periodically transmitted to indicate presence of a wireless network and allow an STA performing scanning to discover the wireless network and participate in the wireless network. An AP serves to periodically transmit a beacon frame in a BSS and STAs transmit beacon frames by turns in an IBSS. An STA performing scanning stores information about a BSS included in a beacon frame upon reception of the beacon frame and records beacon frame information in each channel while moving to other channels. The STA that has received a beacon frame may store BSS related information included in the received beacon frame, move to the next channel and perform scanning in the next channel through the same method.

Active scanning has the advantages of less delay and less power consumption as compared to passive scanning.

After the STA discovers the network, the authentication process may be performed in step S320. This authentication process may be referred to as a first authentication process to be clearly distinguished from a security setup process of step S340 which will be described later.

The authentication process includes a process in which the STA transmits an authentication request frame to the AP and the AP transmits an authentication response frame in response thereto to the STA. An authentication frame used for an authentication request/response corresponds to a management frame.

The authentication frame may include information about an authentication algorithm number, an authentication transaction sequence number, status code, challenge text, an RSN (Robust Security Network), a finite cyclic group, and the like. This corresponds to examples of some of information that may be included in the authentication request/response and may be replaced by other types of information or further include additional information.

The STA may transmit the authentication request frame to the AP. The AP may determine whether to permit authentication of the STA based on information included in the received authentication request frame. The AP may provide an authentication processing result to the STA through the authentication response frame.

After successful authentication of the STA, the association process may be performed in step S330. The association process includes a process in which the STA transmits an association request frame to the AP and the AP transmits an association response frame in response thereto to the STA.

For example, the association request frame may include information related to various capabilities and information about a beacon listen interval, an SSID (service set identifier), supported rates, supported channels, an RSN, mobile domains, supported operating classes, a traffic indication map (TIM) broadcast request, interworking service capability, and the like.

For example, the association response frame may include information related to various capabilities and information about status code, an AID (Association ID), supported rates, an EDCA (Enhanced Distributed Channel Access) parameter set, an RCPI (Received Channel Power Indicator), an RSNI (Received Signal to Noise Indicator), mobile domains, a timeout interval (association comeback time), overlapping BSS scan parameters, TIM broadcast response, a QoS map, and the like.

This corresponds to examples of some of information that may be included in association request/response frame and may be replaced by other types of information or further include additional information.

After successful association of the STA with the network, the security setup process may be performed in step S340. The security setup process of step S340 may also be referred to an authentication process through an RSNA (Robust Security Network Association) request/response, the authentication process of step S320 may also be referred to as a first authentication process and the security setup process of step S340 may also be simply referred to as an authentication process.

The security setup process of step S340 may include a private key setup process through 4-way handshaking using an EAPOL (Extensible Authentication Protocol over LAN) frame, for example. Further, the security setup process may be performed according to a security scheme that is not defined in IEEE 802.11.

Medium Access Mechanism

In a wireless LAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since it is expected that several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception APs and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention-free period (CFP).

Figure 4:
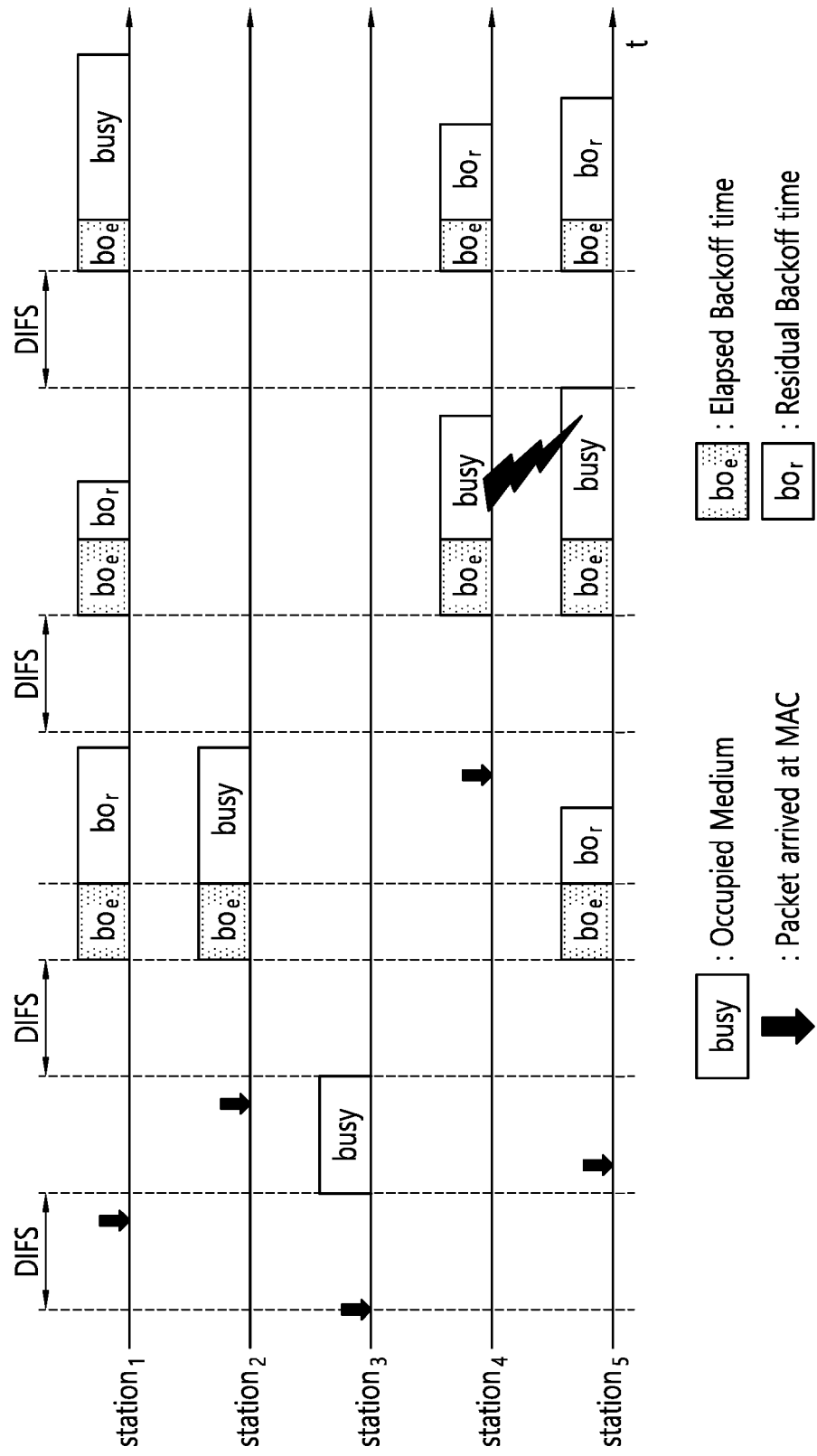
FIG. 4 illustrates a backoff process.

FIG. 4 illustrates a backoff process.

Operation based on a random backoff period will be described with reference to FIG. 4. If a medium is changed from an occupied or busy state to an idle state, STAs may attempt data (or frame) transmission. At this time, as a method for minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to $2n-1$ ($n=0, 1, 2, \ldots$).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 4, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 4, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state, STA1 and STA5 wait for the DIFS and then resume countdown. That is, after the residual backoff slots corresponding to the residual backoff time are counted down, frame transmission may be started. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 4, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a wireless LAN may use a network allocation vector (NAV). The NAV refers to a value of a time until a medium becomes available, which is indicated to another AP and/or STA by an AP and/or an STA which are currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 5 and 7. Although a transmission range may not be equal to an actual carrier sensing range, for convenience, assume that the transmission range may be equal to the actual carrier sensing range.

Figure 5:
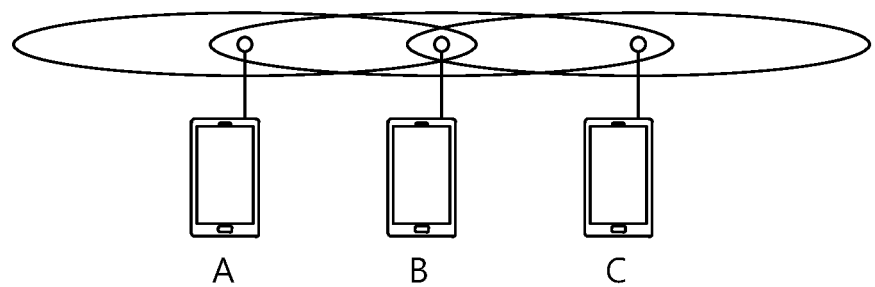
FIG. 5 illustrates a hidden node and an exposed node.
Figure 5:
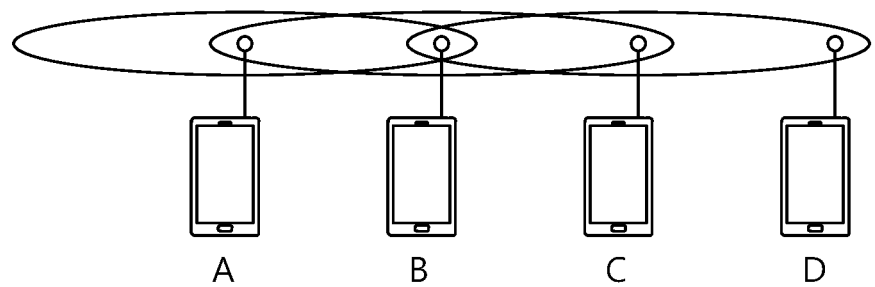

FIG. 5 illustrates a hidden node and an exposed node.

FIG. 5(a) shows a hidden node, and, in this case, an STA A and an STA B are performing communication and an STA C has information to be transmitted. More specifically, although the STA A transmits information to the STA B, the STA C may determine that the medium is in the idle state when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be a hidden node of the STA C.

FIG. 5(b) shows an exposed node and, in this case, the STA B transmits data to the STA A and the STA C has information to be transmitted to the STA D. In this case, if the STA C performs carrier sensing, it may be determined that the medium is busy due to transmission of the STA B. Accordingly, if the STA C has information to be transmitted to the STA D, the STA C waits until the medium enters the idle state since it is sensed that the medium is busy. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be an exposed node of the STA B.

Figure 6:
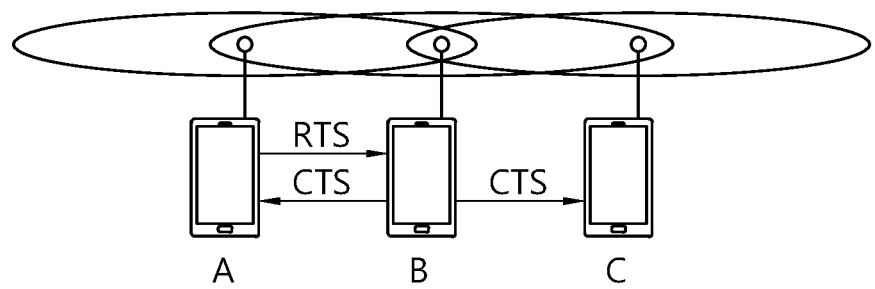
FIG. 6 illustrates RTS and CTS.
Figure 6:
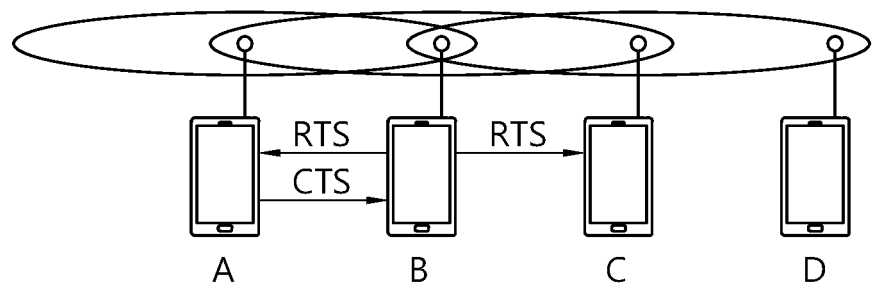

FIG. 6 illustrates RTS and CTS.

In the example of FIG. 5, in order to efficiently use a collision avoidance mechanism, short signaling packet such as RTS (request to send) and CTS (clear to send) may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 6(a) shows a method for solving a hidden node problem. Assume that both the STA A and the STA C attempt to transmit data to the STA B. If the STA A transmits the RTS to the STA B, the STA B transmits the CTS to the peripheral STA A and STA C. As a result, the STA C waits until data transmission of the STA A and the STA B is finished, thereby avoiding collision.

FIG. 6(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS from the STA A, it can be ascertained that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, a power management (PM) mode of the STA is supported in a WLAN system.

The PM mode of STAs is divided into an active mode and a power save (PS) mode. STAs fundamentally operate in an active mode. An STA which operates in the active mode is maintained in an awake state. The awake state refers to a state in which normal operation such as frame transmission and reception or channel scanning is possible. An STA which operates in the PS mode operates while switching between a sleep state or an awake state. An STA which operates in the sleep state operates with minimum power and does not perform frame transmission and reception or channel scanning.

Since power consumption is reduced as the sleep state of the STA is increased, the operation period of the STA is increased. However, since frame transmission and reception are impossible in the sleep state, the STA cannot unconditionally operate in the sleep state. If a frame to be transmitted from the STA operating in the sleep state to an AP is present, the STA may be switched to the awake state to transmit the frame. If a frame to be transmitted from the AP to the STA is present, the STA in the sleep state cannot receive the frame and cannot confirm that the frame to be received is present. Accordingly, the STA may need to perform an operation for switching to the awake state according to a specific period in order to confirm presence of the frame to be transmitted thereto (to receive the frame if the frame to be transmitted is present).

An AP may transmit beacon frames to STAs within a BSS at a predetermined period. The beacon frame may include a traffic indication map (TIM) information element. The TIM information element includes information indicating that buffered traffic for STAs associated with the AP 210 is present and the AP will transmit a frame. The TIM element includes a TIM used to indicate a unicast frame or a delivery traffic indication map (DTIM) used to indicate a multicast or broadcast frame.

Figure 7:
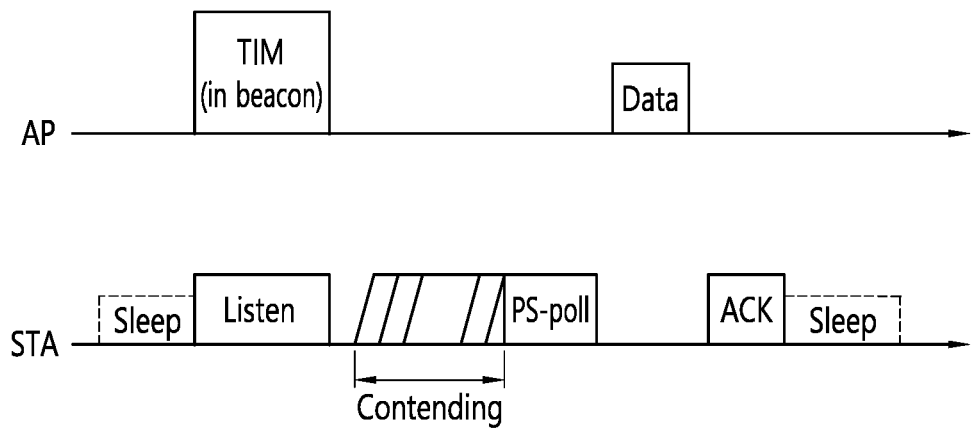
FIG. 7 to FIG. 9 illustrate an operation of an STA which receives a TIM.
Figure 9:
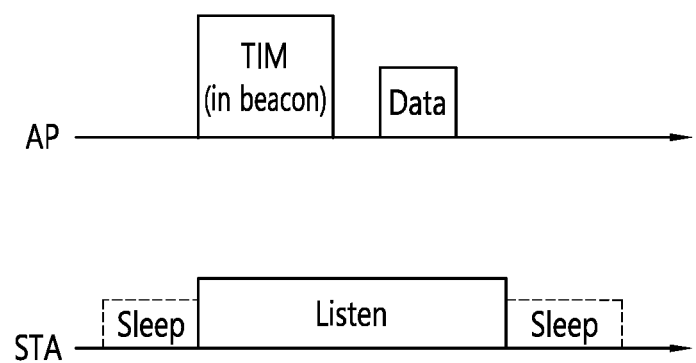

FIG. 7 to FIG. FIG. 9 illustrate an operation of an STA which receives a TIM in detail.

Referring to FIG. 7, an STA may switch from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which has received the PS-Poll frame transmitted by the STA may transmit the frame to the STA. The STA may receive the data frame and transmit an ACK frame to the AP. Thereafter, the STA may switch to the sleep state.

As shown in FIG. 7, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 8.

Figure 8:
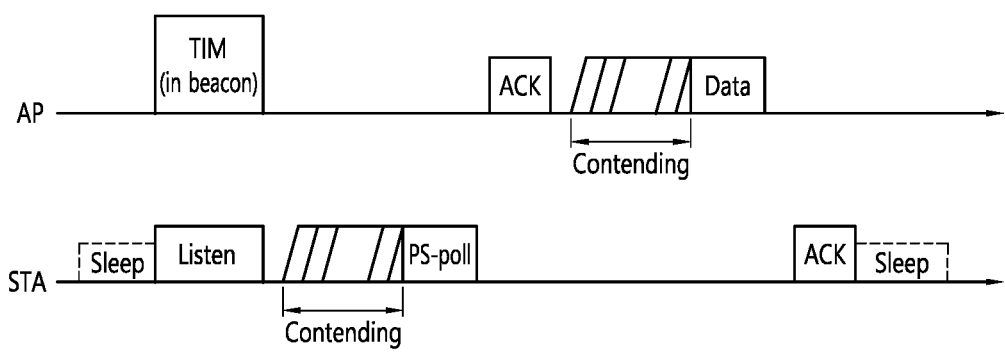

In the example of FIG. 8, the operation of the STA to switch from the sleep state to the awake state, receive a TIM from the AP, perform contending and transmit a PS-Poll frame to the AP is the same as that of FIG. 7. If the data frame is not prepared during the SIFS even when the AP receives the PS-Poll frame, an ACK frame instead of the data frame may be transmitted to the STA. If the data frame is prepared after transmitting the ACK frame, the AP may perform contending and then transmit the data frame to the STA. The STA may transmit an ACK frame indicating that the data frame has been successfully received to the AP and may switch to the sleep state.

FIG. 9 shows an example in which the AP transmits the DTIM. STAs may switch from the sleep state to the awake state in order to receive a beacon frame including the DTIM element from the AP. The STAs may ascertain that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may switch to the sleep state after completing data reception.

General Frame Structure

Figure 10:
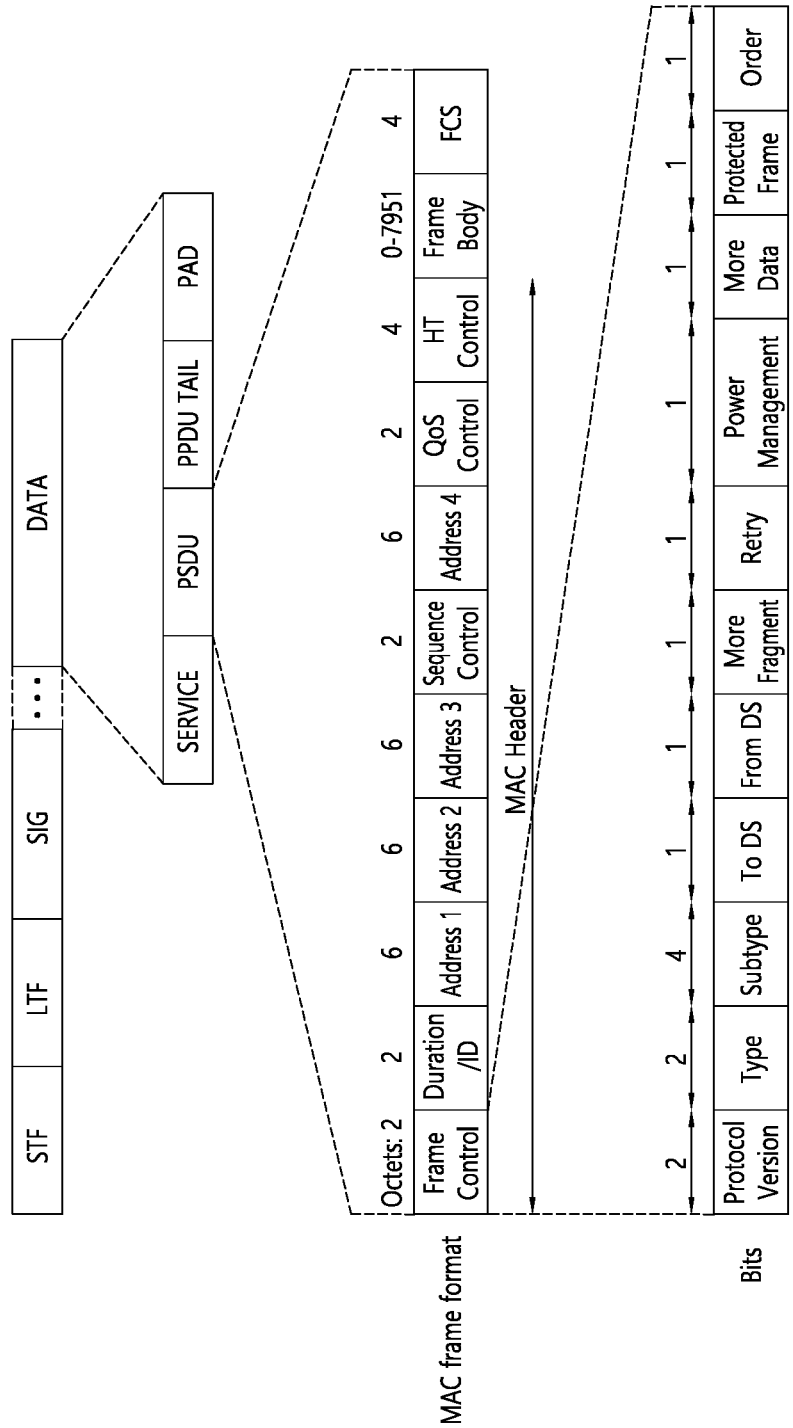
FIG. 10 illustrates an example of a frame structure used in an IEEE 802.11 system.

FIG. 10 illustrates an example of a frame structure used in an IEEE 802.11 system.

A physical layer protocol data unit (PPDU) frame format may include a short training field (STF), a long training field (LTF), a signal (SIG) field and a data field. The most basic (e.g., non-HT (High Throughput)) PPDU frame format may include only legacy-STF (L-STF), legacy-LTF (L-LTF), the SIG field and the data field.

The STF is a signal for signal detection, automatic gain control (AGC), diversity selection, accurate synchronization, and the like and the LTF is a signal for channel estimation, frequency error estimation, and the like. The STF and the LTF may be collectively referred to as a PLCP preamble, and the PLCP preamble may be a signal for synchronization of an OFDM physical layer and channel estimation.

The SIG field may include a RATE field and a LENGTH field. The RATE field may include information about data modulation and coding rate. The LENGTH field may include information about a data length. Additionally, the SIG field may include a parity bit, a SIG TAIL bit, and the like.

The data field may include a SERVICE field, a physical layer service data unit (PSDU), a PPDU TAIL bit and also include padding bits as necessary. Some bits of the SERVICE field may be used for synchronization of a descrambler at a receiving end. The PSDU corresponds to a MAC protocol data unit (MPDU) defined in the MAC layer and may include data generated/used by a higher layer. The PPDU TAIL bit can be used to return an encoder to 0 state. The padding bits can be used to adjust a data field length to a predetermined unit.

The MPDU is defined in various MAC frame formats and a basic MAC frame includes a MAC header, a frame body and a frame check sequence (FCS). The MAC frame includes a MPDU and may be transmitted/received through a PSDU of a PPDU frame format.

The MAC header includes a frame control field, a duration/ID field, and an address field. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may depend on a frame type and a sub-type, whether transmission is performed during a contention-free period (CFP), QoS capability of a transmission STA, and the like. (i) In control frames having a sub-type of PS-Poll, the duration/ID field may include the AID of a transmission STA (e.g., through 14 LSBs) and 2 MSBs may be set to 1. (ii) In frames transmitted by a point coordinator (PC) or a non-QoS STA for the CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined for each frame type. For example, if B15 of the duration/ID field is set to B15=0, it indicates that the duration/ID field is used to indicate a TXOP duration, and B0 to B14 may be used to indicate an actual TXOP duration. The actual TXOP duration indicated by B0 to B14 may be any one of 0 to 32767 and the unit thereof may be microsecond (μs). However, when the duration/ID field indicates a fixed TXOP duration value (e.g., 32768), B15=1 and B0 to B14=0. If B14=1 and B15=1, the duration/ID field is used to indicate an AID and B0 to B13 indicate one AID of 1 to 2007. Refer to IEEE 802.11 standard document for details of the sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard document for details of the subfields of the frame control field.

Figure 11:
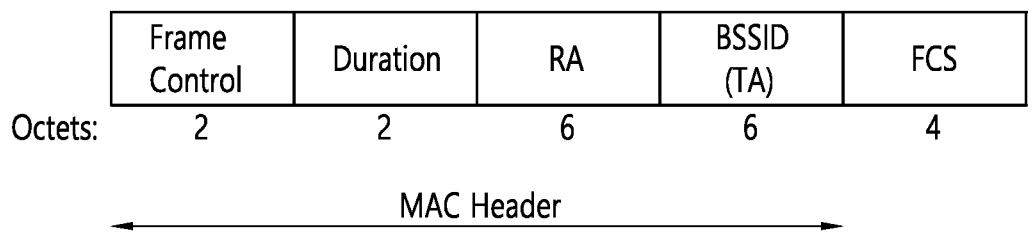
FIG. 11 illustrates a contention-free-END frame.
Figure 13:
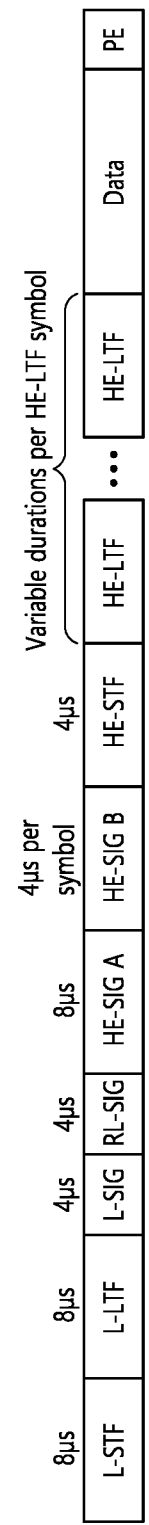
Figure 14:
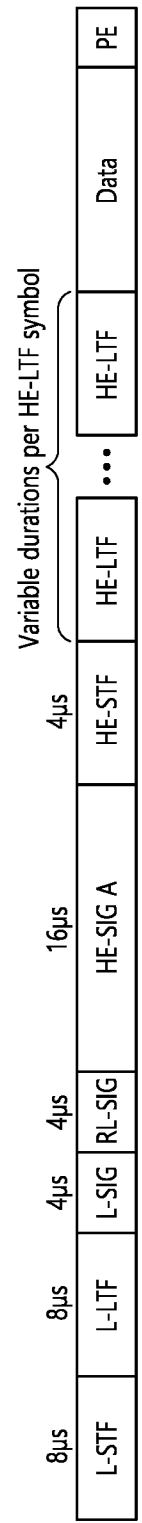
Figure 15:
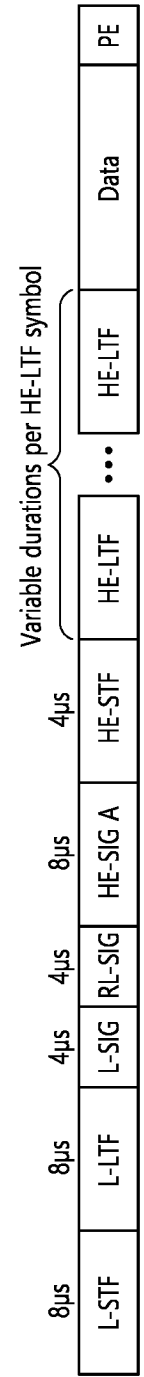

FIG. 11 illustrates a contention-free (CF) end frame.

For convenience of explanation, it is assumed that a CF end frame is transmitted by a non-directional multi-gigabit (DMG, 11ad) STA. The CF end frame may be transmitted to truncate TXOP duration. Therefore, a Duration field is set to 0 in the CF end frame. A Receiver Address (RA) field may be set to a broadcast group address. A BSSID field may be set to an address of a STA included in an AP. However, in a CF end frame in a non-HT or non-HT duplicate format transmitted by a VHT STA to a VHT AP, an Individual/Group bit of a BSSID field may be set to 1.

Example of HE PPDU Structure

Hereinafter, examples of a high-efficiency physical layer protocol data unit (HE PPDU) format in a WLAN system supporting 11ax will be described.

FIG. 12 to FIG. 15 illustrate HE PPDUs.

An HE-SIG-A field is positioned after an L-part (e.g., L-STF, L-LTF, L-SIG) and is duplicated every 20 MHz like the L-part. HE-SIG-A may be included in any HE PPDU, whereas HE-SIG-B may be omitted from a SU PPDU and a UL trigger-based PPDU (e.g., a UL PPDU transmitted based on a trigger frame).

HE-SIG-A includes common control information (e.g., a BW, a GI length, a BSS color, a CRC, a tail, and the like) for STAs. The HE-SIG-A field includes information for interpreting an HE PPDU, and thus the information included in the HE-SIG-A field may change depending on the format of the HE PPDU (e.g., a SU PPDU, a MU PPDU, a trigger-based PPDU, or the like).

For example, (i) in an HE SU PPDU format, an HE-SIG-A field may include at least one of a DL/UL indicator, an HE PPDU format indicator, a BSS color, TXOP duration, a bandwidth (BW), a MCS, a CP+LTF length, coding information, the number of streams, STBC (e.g., whether STBC is used), transmission beamforming (TxBF) information, a CRC and a tail. In the HE SU PPDU format, an HE-SIG-B field may be omitted. (ii) In an HE MU PPDU format, an HE-SIG-A field may include at least one of a DL/UL indicator, a BSS color, TXOP duration, a BW, MCS information of a SIG-B field, the number of symbols of the SIG-B field, and the number of HE LTF symbols, an indicator indicating Full-band MU-MIMO usage indicator, a CP+LTF length, transmission beamforming (TxBF) information, a CRC, and a tail. (iii) In an HE trigger-based PPDU format, an HE-SIG-A field may include at least one of a format indicator (e.g., whether a PPDU is a SU PPDU or a trigger-based PPDU), a BSS color, TXOP duration, a BW, a CRC, and a tail.

HE-SIG-A may include at least one of user allocation information, for example, an STA identifier, such as a PAID or a GID, information about an allocated resource, and the number of streams (Nsts) in addition to the foregoing common information.

BSS color information included in the HE-SIG-A field is information for identifying a BSS and has a shorter length than a BSSID. For example, while the BSSID has a length of 48 bits, the BSS color information may have a length of 6 bits. A STA may determine whether a frame is an intra-BSS frame using the BSS color information. That is, by decoding only the HE-SIG-A field without needing to decode the entire HE PPDU, the STA can distinguish an intra-BSS PPDU from an inter-BSS PPDU through the BSS color information.

HE-SIG-B may be independently encoded every 20-MHz channel. HE-SIG-B encoded every 20-MHz channel may be referred to as an HE-SIG-B content channel.

According to an embodiment, when a bandwidth is not greater than 20 MHz, one HE-SIG-B content channel may be transmitted. When a bandwidth is greater than 20 MHz, each of 20-MHz channels may transmit either a first HE-SIG-B content channel (hereinafter, HE-SIG-B [1]) or a second HE-SIG-B content channel (hereinafter, HE-SIG-B [2]). For example, HE-SIG-B [1] and HE-SIG-B [2] may be alternately transmitted. Odd-numbered 20-MHz channels may transmit HE-SIG-B [1], and even-numbered 20-MHz channels may transmit HE-SIG-B [2]. Specifically, in a 40-MHz bandwidth, HE-SIG-B [1] is transmitted on a first 20-MHz channel, and HE-SIG-B [2] is transmitted on a second 20-MHz channel. In an 80-MHz bandwidth, HE-SIG-B [1] is transmitted on a first 20-MHz channel, HE-SIG-B [2] is transmitted on a second 20-MHz channel, the same HE-SIG-B [1] is repeatedly transmitted on a third channel, and the same HE-SIG-B [2] is repeatedly transmitted on a fourth 20-MHz channel. In a 160-MHz bandwidth, transmission is performed in a similar manner.

HE-SIG-B [1] and HE-SIG-B [2] may have different contents, respectively. However, all pieces of HE-SIG-B [1] have the same content. Likewise, all pieces of HE-SIG-B [2] have the same content.

HE-SIG-B may include a common field and a user-specific field. The common field may precede the user-specific field. The common field and the user-specific field may be divided in bits rather than in OFDM symbols.

The common field of HE-SIG-B includes information about all STAs designated to receive a PPDU in the bandwidth. The common field may include resource unit (RU) allocation information. For example, when four 20-MHz channels forming 80 MHz are divided into [LL, LR, RL, RR], a common block for LL and RL may be included in a common field of HE-SIG-B [1], and a common block for LR and RR may be included in a common field of HE-SIG-B [2].

The user-specific field of HE-SIG-B may include a plurality of user fields, and each user field may include information specific to an individual STA designated to receive a PPDU. For example, the user field may include at least one of a STA ID, a MCS for each STA, the number of streams (Nsts), coding (e.g., an indication as to use of LDPC), a DCM indicator, and transmission beamforming information but is not limited thereto.

Figure 16:
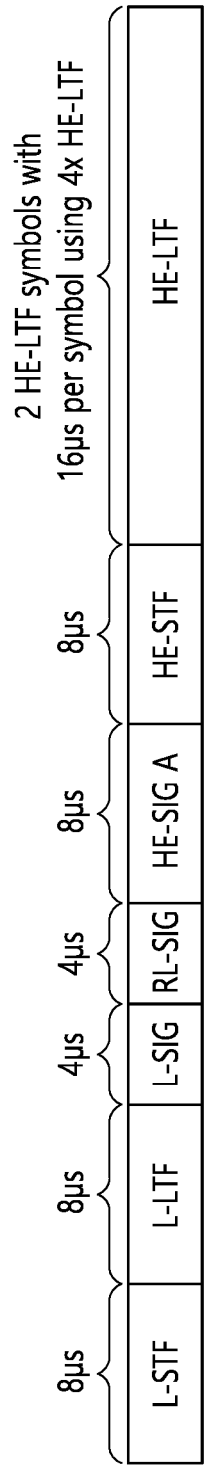
FIG. 16 illustrates an HE TB NDP feedback PPDU.

FIG. 16 illustrates an HE TB NDP feedback PPDU.

The HE TB NDP feedback PPDU is used to carry NDP feedback report information. The HE TB NDP feedback PPDU uses an HE TB PPDU format in which a data field is omitted and PE duration=0 is set. The TB NDP feedback PPDU has two 4×HE-LTF symbols. In the TB NDP feedback PPDU, 4×HE-LTF, $T_{GI4,Data}$ denotes a combination of the only HE-LTF mode and a GI. An HE-STF and pre HE modulation fields are transmitted only on a 20-MHz channel.

The HE-LTF symbols of the HE TB NDP feedback PPDU are generated as follows.

An HE-LTF is provided to a receiver for MIMO channel estimation. Only a 4×HE-LTF is used for the HE-LTF of the HE TB NDP feedback PPDU and is defined by Equation 1.

$$HELTF_{k,u}^{TB\_NDP} = \begin{cases} HELTF_k, & \text{if } k \in K_{tone\_NDP_u} \\ 0, & \text{otherwise} \end{cases} \quad \text{[Equation 1]}$$

In Equation 1, $HELTF_k$ is a common HE LTF sequence on subcarrier k and is generated by 4×HE LTF equations according to a channel bandwidth. $K_{tone\_NDPu}$ denotes a subcarrier index for user u and is defined as in Table 1 and Table 2 according to an RU tone set index and a feedback status.

TABLE 1

| RU_TONE_SET_INDEX | 80 MHz | | 40 MHz | | 20 MHz | |
|---|---|---|---|---|---|---|
| | Ktone_NDPu if FEED-BACK_STATUS is 1 | Ktone_NDPu if FEED-BACK_STATUS is 0 | Ktone_NDPu if FEED-BACK_STATUS is 1 | Ktone_NDPu if FEED-BACK_STATUS is 0 | Ktone_NDPu if FEED-BACK_STATUS is 1 | Ktone_NDPu if FEED-BACK_STATUS is 0 |
| 1 | Use 20 MHZ FEED-BACK_STA-TUS = 1 | Use 20 MHZ FEED-BACK_STA-TUS = 0 | Use 20 MHZ FEED-BACK_STA-TUS = 1 | Use 20 MHZ FEED-BACK_STA-TUS = 0 | −113, −77, −41, 6, 42, 78 | −112, −76, −40, 7, 43, 79 |
| 2 | | | | | −111, −75, −39, 8, 44, 80 | −110, −74, −38, 9, 45, 81 |
| 3 | Subcarrier Indices − 384 | Subcarrier Indices − 384 | Subcarrier Indices − 384 | Subcarrier Indices − 384 | −109, −73, −37, 10, 46, 82 | −108, −72, −36, 11, 47, 83 |
| 4 | | | | | −107, −71, −35, 12, 48, 84 | −106, −70, −34, 13, 49, 85 |
| 5 | | | | | −105, −69, −33, 14, 50, 86 | −104, −68, −32, 15, 51, 87 |
| 6 | | | | | −103, −67, −31, 16, 52, 88 | −102, −66, −30, 17, 53, 89 |

TABLE 1-continued

| | 80 MHz | | 40 MHz | | 20 MHz | |
|---|---|---|---|---|---|---|
| RU_TONE_SET_INDEX | Ktone_NDPu if FEEDBACK_STATUS is 1 | Ktone_NDPu if FEEDBACK_STATUS is 0 | Ktone_NDPu if FEEDBACK_STATUS is 1 | Ktone_NDPu if FEEDBACK_STATUS is 0 | Ktone_NDPu if FEEDBACK_STATUS is 1 | Ktone_NDPu if FEEDBACK_STATUS is 0 |
| 7 | | | | | −101, −65, −29, 18, 54, 90 | −100, −64, −28, 19, 55, 91 |
| 8 | | | | | −99, −63, −27, 20, 56, 92 | −98, −62, −26, 21, 57, 93 |
| 9 | | | | | −97, −61, −25, 22, 58, 94 | −96, −60, −24, 23, 59, 95 |
| 10 | | | | | −95, −59, −23, 24, 60, 96 | −94, −58, −22, 25, 61, 97 |
| 11 | | | | | −93, −57, −21, 26, 62, 98 | −92, −56, −20, 27, 63, 99 |
| 12 | | | | | −91, −55, −19, 28, 64, 100 | −90, −54, −18, 29, 65, 101 |
| 13 | | | | | −89, −53, −17, 30, 66, 102 | −88, −52, −16, 31, 67, 103 |
| 14 | | | | | −87, −51, −15, 32, 68, 104 | −86, −50, −14, 33, 69, 105 |
| 15 | | | | | −85, −49, −13, 34, 70, 106 | −84, −48, −12, 35, 71, 107 |
| 16 | | | | | −83, −47, −11, 36, 72, 108 | −82, −46, −10, 37, 73, 109 |
| 17 | | | | | −81, −45, −9, 38, 74, 110 | −80, −44, −8, 39, 75, 111 |
| 18 | | | | | −79, −43, −7, 40, 76, 112 | −78, −42, −6, 41, 77, 113 |

TABLE 2

| | 80 MHz | | 40 MHz | | 20 MHz | |
|---|---|---|---|---|---|---|
| RU_TONE_SET_INDEX | Ktone_NDPu if FEEDBACK_STATUS is 1 | Ktone_NDPu if FEEDBACK_STATUS is 0 | Ktone_NDPu if FEEDBACK_STATUS is 1 | Ktone_NDPu if FEEDBACK_STATUS is 0 | Ktone_NDPu if FEEDBACK_STATUS is 1 | Ktone_NDPu if FEEDBACK_STATUS is 0 |
| 19-36 | Use 20 MHZ FEEDBACK_STATUS = 1 Subcarrier Indices − 128 | Use 20 MHZ FEEDBACK_STATUS = 0 Subcarrier Indices − 128 | Use 20 MHZ FEEDBACK_STATUS = 1 Subcarrier Indices + 128 | Use 20 MHZ FEEDBACK_STATUS = 0 Subcarrier Indices + 128 | | |
| 37-54 | Use 20 MHZ FEEDBACK_STATUS = 1 Subcarrier Indices + 128 | Use 20 MHZ FEEDBACK_STATUS = 0 Subcarrier Indices + 128 | | | | |
| 55-72 | Use 20 MHZ FEEDBACK_STATUS = 1 Subcarrier Indices + 384 | Use 20 MHZ FEEDBACK_STATUS = 0 Subcarrier Indices + 384 | | | | |

NDP feedback report poll variant: In an NDP feedback report poll trigger frame, an RA field is set to a broadcast address. A BW subfield indicates a bandwidth of an NDP feedback report response. A CS Request subfield may be set to 0. STBC, LDPC Additional Symbol Segment, Packet Extension, and Doppler subfields are reserved. An HE-LTF Number subfield of a Common Info field indicates the number of HE-LTF symbols present in the NDP feedback report response and is set to 2 for two HE-LTF symbols. GI and LTF Type subfields of the Common Info field are set to 2. Trigger Dependent Common Info subfield is not provided. A User Information field includes a Starting AID subfield, a Reserved subfield, a Feedback Type subfield, a Reserved subfield, a Target RSSI subfield, and a Multiplexing Flag subfield. The Feedback Type subfield is defined as shown in Table 3.

TABLE 3

| Value | Description |
|---|---|
| 0 | Resource request |
| 2-15 | Reserved |

A scheduled HE non-AP STA is identified by an AID range. The Starting AID field defines a first AID scheduled to respond to the NDP feedback report poll trigger frame in the AID range. The Target RSSI subfield indicates target RSSI power for the NDP feedback report response to all scheduled STAs. The resolution of the Target RSSI subfield is 1 dB.

$N_{STA}$, which is the total number of STAs scheduled to respond to the NDP feedback report poll trigger frame is represented by Equation 2.

$$N_{STA}=18\times2^{BW}\times(\text{Multiplexing Flag})\qquad[\text{Equation 2}]$$

Here, BW is a value indicated in the BW subfield of the NDP feedback report poll trigger frame, and the multiplexing flag is a value indicated in the Multiplexing Flag subfield of the NDP feedback report poll trigger frame. The Multiplexing Flag subfield indicates the number of STAs multiplexed with a P-matrix code on the same tone set in the same RU and is encoded as the number of STAs−1.

NDP Feedback Report Procedure

NDP feedback reporting is a mechanism for an HE AP to collect short feedback from a plurality of HE STAs in a more efficient manner than an HE TB PPDU. Feedback (e.g., resource requests) is transmitted without a data payload in response to a trigger frame. Feedback is not for channel sounding.

The HE AP transmits an NDP feedback report poll trigger frame to request an NDP feedback report response from a plurality of STAs identified by a range of scheduled AIDs in the trigger frame. An NDP feedback report response from an HE non-AP STA is an HE TB PPDU without data payload. The HE non-AP STA identifies whether the HE non-AP STA is scheduled using information delivered via the NDP feedback report poll trigger frame, and obtains a parameter for response transmission if scheduled.

(i) STA Operation

If supporting NDP feedback reporting, the STA sets an NDP Feedback Report Support subfield of an HE capabilities element to 1; otherwise, the STA sets the NDP Feedback Report Support subfield to 0.

The STA should not transmit an NDP feedback report response if one of the following operation modes is not explicitly activated by the AP. The frame interval between the NDP feedback report poll trigger frame and a PPDU including an NDP feedback report poll response is SIFS. When all of the following conditions are satisfied, the STA transmits an NDP feedback report response at the boundary of SIFS time after a received PPDU ends.

Condition that the received PPDU includes the NDP feedback report poll trigger frame Condition that the STA is scheduled by the NDP feedback report poll trigger frame Condition that an NDP Feedback Report Support subfield of an HE MAC Capabilities Information field is set to 1

Condition that the STA provides a response to an NDP feedback type included in the NDP feedback report poll trigger frame When none of the above conditions is satisfied, the STA does not need to respond to the NDP feedback report poll trigger frame.

When the AID of the STA is equal to or greater than a starting AID and is less than the starting AID+$N_{STA}$, the STA is scheduled to respond to the NDP feedback report poll trigger frame using a Starting AID subfield in an eliciting trigger frame and $N_{STA}$. $N_{STA}$, which is the number of STAs scheduled to respond to the NDP feedback report poll trigger frame, is calculated using a BW subfield and a Multiplexing Flag subfield of the eliciting trigger frame.

Transmission of HE NDP feedback report response: A STA that transmits an NDP feedback report response to a trigger frame sets a TXVECTOR parameter similarly to transmission of an HE TB PPDU in response to a trigger frame but has the following differences.

FORMAT is set to HE_TRIG.

PSDU_LENGTH is set to 0.

An RU_ALLOCATION parameter is set to the maximum RU size of a BW.

An RU_TONE_SET_INDEX parameter is set to RU_TONE_SET_INDEX=(AID−Starting AID) mod (18×2BW) using the value of a Starting AID subfield in a User Information field of the trigger frame.

A NUM_STS parameter is set to 1

A STARTING_STS_NUM parameter is set through the following equation STARTING_STS_NUM=(Floor ((AID−Starting AID)/18/2BW)) along with the value of the Starting AID subfield in the User Information field of the trigger frame.

MCS is set to 0.

DCM is set to 0.

FEC_CODING is set to 0.

A TXPWR_LEVEL_INDEX parameter needs to be set to a value based on transmission power control of an HE TB PPDU and is based on the value of an AP Tx Power subfield and the value of an Target RSSI subfield in the User Information field of the trigger frame.

The STA that transmits the NDP feedback report response to the trigger frame needs to modulate an allocated tone as follows.

Each STA scheduled to provide a feedback report is allocated 12 tones of STARTING_STS_NUM and RU_TONE_SET in order to transmit bit FEEDBACK_STATUS. A set of 12 tones for each STA is divided into two groups including six tones.

When FEEDBACK_STATUS=1, the STA forwards energy only via six tones of a first group in RU_TONE_SET of 12 tones allocated on allocated RU_allocation.

When FEEDBACK_STATUS=0, the STA forwards energy only via six tones of a second group in RU_TONE_SET of 12 tones allocated on allocated RU_allocation.

(ii) AP Operation

Reception of NDP feedback report responses: Following transmission of an NDP feedback report poll trigger frame by the AP, a plurality of STAs may simultaneously transmit an NDP feedback report response to the AP. Based on RXVECTOR parameter NDP_REPORT, which provides a vector of a detected bit for each P-matrix code of each RU_TONE_SET_INDEX, the AP may derive a list of AIDs about which an NDP feedback report response is transmitted and the response. The AP should not transmit any acknowledgment in response to receipt of an NDP feedback report response.

NDP feedback report with resource request type: The HE AP may transmit an NDP feedback report poll trigger frame in which a Type subfield is set to 0 for a resource request. When a Feedback Type subfield of a User Information field of the NDP feedback report poll trigger frame is set to 0 for the resource request, a scheduled STA may put a packet that the STA has into a queue and may transmit an NDP feedback report response in order to notify the AP that the STA wants triggering in UL MU.

Each STA scheduled to provide a feedback report is allocated 12 tones of STARTING_STS_NUM and RU_TONE_SET_INDEX in order to transmit bit FEEDBACK_STATUS.

The value of corresponding bit b is described in Table 4.

TABLE 4

| Value | Description |
|---|---|
| 0 | Resource request with buffered bytes for transmission between 1 and the Resource request buffer threshold. |
| 1 | Resource request with buffered bytes for transmission above the Resource request buffer threshold. |

A resource request buffer threshold is equal to $2^{(resource\ request\ buffer\ threshold\ index)}$ octets using a Resource Request Buffer Threshold subfield of the most recently received NDP feedback report parameter set element transmitted by the AP associated with the STA. When the NDP feedback report parameter set element is not transmitted by the AP associated with the STA, the resource request buffer threshold is equal to 256 octets.

HARQ Feedback Frame Format for WLAN

According to a hybrid automatic repeat request (HARQ), initial transmission and retransmission are combined in order to finally receive data properly, and data may also be properly received with a very small number of retransmissions.

An ARQ protocol is used in a conventional WLAN, while an HARQ process may be introduced in a next-generation WLAN for aggressive MCS selection and improvement in data rate at a cell edge.

In a next-generation WLAN system in which an HARQ process is introduced, a transmitting STA may configure and transmit an HARQ burst (i.e., an HARQ frame or HARQ PPDU). For example, an HARQ burst may refer to unit data to which an HARQ process is applied.

Hereinafter, a method of transmitting a response frame (e.g., an HARQ feedback frame/PPDU) to an HARQ burst (or HARQ frame or HARQ PPDU) is described.

In this specification, when a receiving STA receives a PPDU including HARQ data (e.g., an HARQ MU/SU PPDU), the receiving STA may transmit an HARQ feedback frame to a transmitting STA in response to the PPDU including the HARQ data. The HARQ feedback frame may include HARQ feedback information indicating whether a reception result is an ACK or an NACK.

In this specification, when a bandwidth for transmitting an HARQ PPDU is 20 MHz, a 4×HE-LTF sequence may be transmitted on subcarriers [−122: 122]. In this case, the 4×HE-LTF sequence may be defined as shown in Table 5.

TABLE 5

$HELTF_{-122, 122} =$
{−1, −1, +1, −1, +1, −1, +1, +1, +1, −1, +1, +1, +1, −1, −1, +1, −1, −1, −1, −1, −1, +1,
+1, −1, −1, −1, −1, +1, +1, −1, +1, −1, +1, +1, +1, +1, −1, +1, −1, −1, +1, +1, −1, +1, +1,
+1, +1, −1, −1, +1, −1, −1, −1, +1, +1, +1, +1, −1, +1, +1, −1, −1, −1, +1, −1, −1, −1, +1,
+1, −1, +1, −1, −1, −1, −1, +1, −1, +1, −1, −1, −1, −1, −1, −1, +1, +1, −1, −1, −1, −1,
−1, +1, −1, −1, +1, +1, +1, −1, +1, +1, +1, −1, +1, −1, +1, −1, −1, −1, −1, −1, +1, +1, +1,
−1, −1, −1, +1, −1, +1, +1, +1, 0, 0, 0, −1, +1, −1, +1, −1, +1, +1, −1, +1, +1, +1, −1, −1,
+1, −1, −1, +1, −1, +1, −1, +1, +1, −1, +1, +1, −1, +1, −1, −1, −1, −1, −1, −1, −1, +1,
+1, −1, −1, −1, −1, −1, −1, +1, −1, +1, −1, −1, −1, −1, +1, −1, +1, +1, +1, −1, −1, +1, −1,
−1, −1, −1, +1, +1, −1, +1, +1, +1, +1, +1, +1, +1, −1, +1, +1, −1, −1, −1,−1, +1, −1, −1,
+1, +1, −1, +1, −1, −1, −1, −1, +1, −1, +1, −1, −1, +1, +1, +1, +1, −1, −1, +1, +1, +1, +1,
+1, −1, +1, +1, −1, −1, −1, +1, −1, −1, −1, +1, −1, +1, −1, +1, +1}

In this specification, when a bandwidth for transmitting an HARQ PPDU is 40 MHz, a 4×HE-LTF sequence may be transmitted on subcarriers [−244: 244]. In this case, the 4×HE-LTF sequence may be defined as shown in Table 6.

TABLE 6

$HELTF_{-244, 244} =$
{+1, −1, −1, −1, −1, +1, −1, −1, +1, +1, −1, +1, −1, +1, −1, +1, +1, −1, +1, −1, −1, −1,
+1, +1, −1, −1, −1, −1, −1, −1, −1, +1, −1, −1, +1, +1, −1, +1, −1, −1, −1, −1, +1, −1,
+1, +1, +1, −1, −1, +1, +1, +1, −1, −1, +1, +1, +1, +1, −1, +1, +1, −1, −1, +1, −1, +1, −1,
+1, −1, −1, +1, −1, +1, +1, +1, −1, −1, +1, +1, +1, −1, −1, −1, +1, −1, −1, +1, +1, −1,
+1, −1, −1, −1, −1, +1, −1, +1, +1, +1, −1, −1, +1, +1, +1, +1, +1, +1, +1, −1, +1,
+1, −1, −1, +1, −1, +1, +1, +1, +1, −1, +1, −1, −1, −1, +1, +1, −1, −1, −1, −1, −1, −1,
−1, −1, +1, −1, −1, +1, +1, −1, +1, −1, −1, +1, +1, −1, +1, −1, −1, −1, +1, +1, −1, −1,
−1, −1, +1, −1, −1, −1, −1, −1, −1, −1, +1, −1, −1, +1, −1, +1, +1, +1, −1,
−1, +1, +1, +1, −1, −1, −1, −1, −1, +1, −1, −1, +1, +1, −1, +1, −1, +1, −1, +1, +1, −1,
+1, −1, −1, +1, +1, −1, −1, −1, +1, +1, +1, +1, −1, +1, +1, −1, −1, +1, −1, +1, +1, +1,
+1, +1, −1, +1, −1, −1, −1, +1, +1, −1, −1, −1, +1, 0, 0, 0, 0, 0, −1, +1, +1, +1, +1, −1, +1,
+1, −1, +1, −1, −1, +1, −1, +1, −1, −1, +1, +1, +1, +1, −1, −1, +1, +1, +1, +1, +1,
+1, −1, +1, −1, −1, +1, +1, +1, +1, +1, −1, +1, −1, −1, −1, +1, +1, −1, −1, −1, −1,
+1, +1, −1, −1, −1, +1, −1, +1, +1, +1, −1, +1, −1, +1, −1, +1, +1, −1, +1, −1, −1, −1,
+1, +1, −1, −1, +1, +1, +1, +1, −1, +1, +1, −1, −1, −1, +1, +1, +1, +1, +1, −1, +1,
−1, −1, −1, +1, +1, −1, −1, −1, +1, −1, −1, −1, −1, +1, −1, −1, +1, −1, +1, −1, +1, −1,
+1, +1, −1, +1, −1, −1, +1, +1, −1, −1, −1, +1, −1, −1, −1, −1, +1, −1, −1, +1, +1, −1,
+1, −1, −1, +1, +1, −1, −1, +1, −1, −1, −1, +1, −1, −1, −1, −1, +1, −1, −1, −1, −1, +1,
+1, +1, −1, +1, −1, −1, −1, −1, +1, −1, +1, +1, +1, −1, −1, +1, +1, +1, −1, +1, −1, −1, +1,
−1, −1, +1, −1, +1, +1, −1, +1, −1, −1, +1, +1, +1, +1, +1, −1, +1, −1, −1, −1, +1,
−1, +1, +1, +1, +1, −1, +1, +1, −1, −1, +1, −1, +1, +1, +1, +1, −1, +1, −1, −1, −1, +1,
+1, −1, −1, −1, −1}

In this specification, when a bandwidth for transmitting an HARQ PPDU is 80 MHz, a 4×HE-LTF sequence may be transmitted on subcarriers [−500: 500]. In this case, the 4×HE-LTF sequence may be defined as shown in Table 7.

TABLE 7

HELTF$_{-500, 500}$ =
{+1, +1, −1, +1, −1, +1, −1, −1, −1, +1, −1, −1, −1, +1, +1, −1, +1, +1, +1, +1, +1, −1,
−1, +1, +1, +1, +1, −1, +1, −1, +1, −1, −1, +1, +1, −1, +1, +1, +1, −1, −1, +1, −1, −1, −1,
−1, +1, +1, +1, −1, −1, −1, −1, −1, −1, +1, +1, +1, +1, +1, +1, −1, +1, +1, +1, −1, +1, +1,
−1, −1, −1, +1, −1, +1, −1, −1, +1, +1, −1, −1, +1, +1, +1, +1, +1, −1, −1, +1, +1, +1,
−1, +1, +1, −1, +1, −1, +1, −1, +1, −1, +1, +1, −1, +1, +1, +1, +1, +1, −1, −1,
+1, +1, +1, +1, +1, −1, +1, +1, −1, −1, −1, +1, −1, −1, −1, +1, −1, +1, −1, +1, +1, −1, +1,
−1, +1, −1, +1, +1, +1, −1, +1, +1, +1, −1, −1, +1, −1, −1, −1, −1, +1, +1, −1, −1, −1,
−1, +1, −1, +1, −1, +1, +1, −1, −1, +1, −1, −1, −1, +1, +1, −1, +1, +1, +1, +1, −1, −1, −1,
+1, +1, +1, −1, +1, +1, +1, +1, +1, +1, −1, −1, +1, −1, −1, −1, +1, +1, +1, +1, −1, −1, +1,
−1, +1, −1, −1, +1, +1, −1, +1, −1, +1, +1, +1, −1, −1, +1, +1, +1, −1, +1, +1, −1,
−1, −1, +1, −1, +1, +1, −1, +1, +1, −1, +1, −1, −1, +1, −1, +1, −1, +1, −1, +1, +1, −1,
+1, +1, +1, −1, −1, +1, −1, −1, −1, −1, −1, +1, +1, −1, −1, −1, −1, +1, −1, +1, −1, +1, +1,
−1, −1, +1, −1, −1, −1, +1, −1, +1, +1, +1, +1, −1, −1, +1, +1, +1, +1, +1, −1, −1, +1,
−1, −1, −1, −1, −1, +1, −1, −1, −1, +1, −1, +1, +1, +1, −1, +1, −1, +1, +1, −1, −1, +1,
−1, +1, −1, −1, −1, −1, −1, +1, +1, −1, −1, −1, +1, −1, −1, +1, +1, +1, −1, +1, −1, −1, +1,
−1, −1, +1, −1, +1, +1, +1, +1, +1, +1, −1, −1, +1, +1, +1, +1, +1, −1, +1, +1, −1, −1, −1,
+1, −1, −1, +1, −1, +1, +1, −1, +1, +1, +1, −1, −1, +1, +1, −1, +1, +1, −1, +1, +1, −1, +1,
−1, +1, −1, −1, −1, −1, +1, −1, −1, −1, −1, +1, −1, +1, −1, +1, +1, −1, −1, +1, −1,
−1, −1, +1, +1, −1, +1, +1, +1, +1, −1, −1, −1, +1, +1, +1, +1, −1, −1, +1, +1, +1, +1,
+1, −1, +1, +1, +1, −1, +1, +1, −1, −1, −1, +1, −1, +1, −1, −1, +1, +1, −1, +1, −1, +1, +1,
+1, +1, +1, −1, +1, +1, −1, +1, +1, +1, −1, −1, −1, −1, +1, +1, −1, −1, +1, +1, +1, −1, +1,
−1, −1, −1, +1, −1, +1, −1, −1, −1, −1, +1, +1, +1, −1, −1, +1, 0, 0, 0, 0, 0, +1, −1, −1,
−1, −1, −1, +1, −1, +1, +1, −1, −1, +1, +1, −1, +1, −1, +1, +1, −1, −1, +1, −1, +1, −1,
−1, −1, +1, +1, −1, +1, +1, +1, −1, +1, +1, +1, +1, +1, +1, +1, −1, +1, −1, −1, +1, −1, −1,
+1, −1, +1, +1, +1, −1, +1, +1, −1, +1, +1, +1, +1, −1, −1, +1, −1, +1, +1, −1, −1, −1,
−1, +1, +1, −1, −1, −1, −1, +1, −1, +1, +1, +1, −1, +1, +1, +1, −1, +1, −1, +1, −1, −1,
−1, −1, −1, +1, +1, +1, −1, −1, −1, −1, +1, −1, −1, +1, +1, +1, −1, +1, +1, −1, −1, +1,
−1, +1, −1, −1, −1, −1, −1, −1, +1, +1, −1, −1, −1, +1, −1, −1, +1, +1, +1, −1, −1, +1,
−1, +1, −1, −1, +1, +1, +1, −1, −1, −1, +1, +1, −1, −1, −1, +1, −1, −1, +1, +1, −1, −1,
+1, −1, −1, +1, +1, −1, −1, −1, −1, +1, +1, +1, −1, −1, +1, +1, +1, −1, +1, +1, −1, +1, +1,
−1, +1, +1, −1, +1, +1, +1, −1, −1, +1, +1, +1, +1, −1, +1, −1, −1, −1, −1, +1, +1, −1,
−1, −1, −1, −1, +1, −1, +1, +1, −1, +1, +1, +1, −1, +1, −1, +1, −1, −1, −1, −1, −1, −1,
+1, +1, +1, −1, −1, −1, −1, +1, −1, −1, +1, +1, +1, −1, +1, +1, −1, −1, +1, −1, +1, −1, +1,
+1, +1, −1, −1, +1, −1, +1, +1, +1, −1, +1, +1, −1, +1, +1, +1, −1, −1, +1, −1, +1, −1,
−1, −1, −1, −1, −1, +1, −1, +1, −1, +1, +1, −1, +1, −1, −1, −1, +1, +1, −1, +1, +1, +1,
−1, −1, +1, +1, +1, +1, −1, +1, +1, +1, +1, −1, −1, +1, +1, +1, +1, +1, −1, +1, +1, +1,
−1, −1, −1, +1, −1, −1, −1, +1, −1, +1, −1, +1, +1, +1, +1, −1, −1, −1, +1, +1, +1, +1,
−1, +1, −1, +1, +1, −1, −1, −1, +1, −1, −1, +1, −1, −1, −1, −1, +1, −1, −1, +1, +1,
−1, −1, −1, +1, −1, +1, +1, +1, −1, +1, −1, −1, +1, −1, +1, −1, +1, −1, +1, −1, −1, +1,
−1, +1, +1, −1, +1, −1, +1, +1, −1, −1, +1, −1, −1, −1, +1, −1, −1, −1, −1, −1, +1,
−1, +1, −1, +1, +1, −1, +1, +1, −1, +1, −1, −1, +1, +1, −1, +1, +1, +1, −1, −1, +1, +1,
+1, +1, +1, −1, +1, −1, −1, +1, −1, −1, −1, −1, +1, −1, −1, −1, +1, −1, +1, +1, +1, −1,
+1, +1, +1, −1, +1, +1, +1, −1, −1, −1, −1, +1, +1, +1, −1, −1, −1, −1, +1, −1, −1, +1,
+1, +1, −1, +1, +1, −1, −1, +1, −1, +1, −1, +1}

Figure 17:
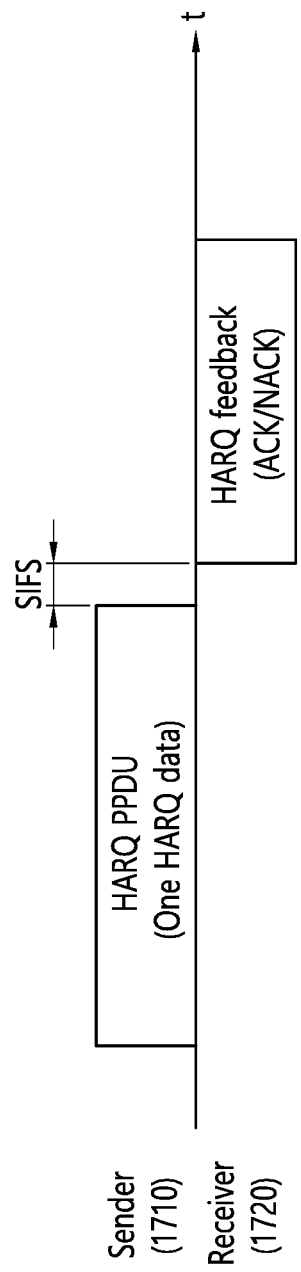
FIG. 17 illustrates a process of transmitting an HARQ feedback frame according to an embodiment.

FIG. 17 illustrates a process of transmitting an HARQ feedback frame according to an embodiment.

Referring to FIG. 1 to FIG. 17, a transmitting terminal 1710 may transmit an HARQ PPDU including one piece of HARQ data (or burst) to a receiving terminal 1720.

For example, when the receiving terminal 1720 properly receives the HARQ data, the receiving terminal 1720 may transmit an HARQ feedback frame including ACK information. For example, when the receiving terminal 1720 determines that an error (e.g., a CRC error) exists in the received HARQ data, the receiving terminal 1720 may transmit an HARQ feedback frame including NACK information.

An HARQ feedback frame according to this embodiment may include ACK information or NACK information about the received HARQ data. According to this embodiment, after a lapse of a predetermined time (i.e., SIFS) from reception of the HARQ PPDU including the HARQ data (or burst), the HARQ feedback frame may be transmitted.

Figure 18:
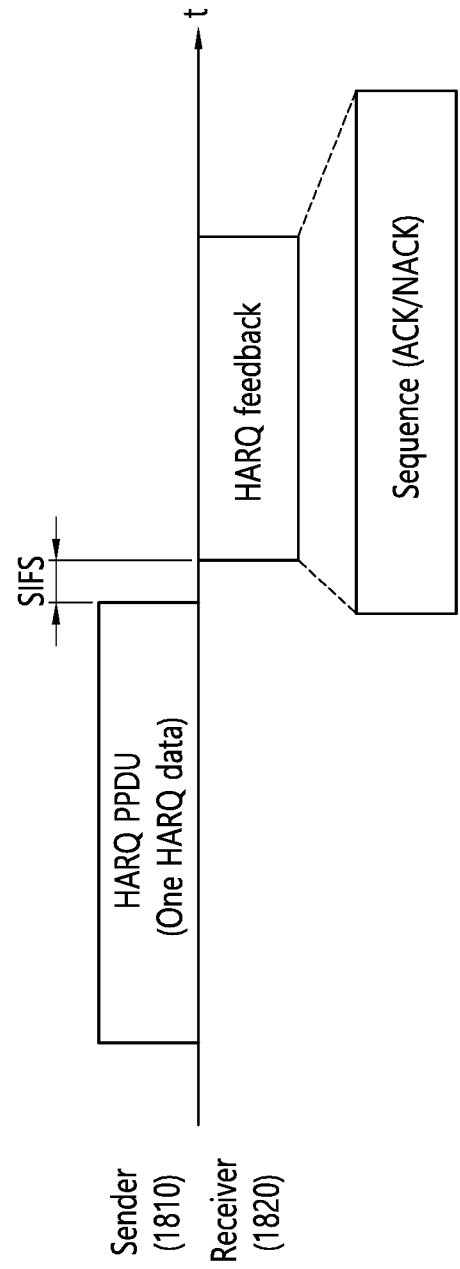
FIG. 18 illustrates a process of transmitting an HARQ feedback frame based on a predetermined sequence according to an embodiment.

FIG. 18 illustrates a process of transmitting an HARQ feedback frame based on a predetermined sequence according to an embodiment.

Referring to FIG. 17 and FIG. 18, an HARQ feedback frame of FIG. 18 may include sequence X related to an ACK or sequence Y related to an NACK.

For example, sequence X and sequence Y may be configured to be orthogonal to each other. That is, sequence Y may be complementary to sequence X.

For example, sequence Y=−sequence X. In another example, when sequence X=STF sequence or LTF sequence, sequence Y=−STF sequence or −LTF sequence.

For example, sequence X is may be any one of STFs (e.g., STF, L-STF, HT-STF, VHT-STF, HE-STF, and TV-STF) and LTFs (e.g., LTF, L-LTF, HT-LTF, VHT-LTF, HE-LTF, and TV-LTF) defined in 802.11 standard and sync sequences defined in 802.11ba.

In this specification, an STF may be an L-STF, an HE-STF, or an EHT-STF, and an LTF may be an L-LTF, HE-LTF, or an EHT-LTF.

After transmitting an HARQ PPDU, a transmitting terminal 1810 of FIG. 18 expects to receive an HARQ feedback frame including an ACK sequence or a NACK sequence after a lapse of a predetermined time (i.e., SIFS).

After a lapse of the predetermined time (i.e., SIFS) from reception of the HARQ PPDU including single-HARQ data, a receiving terminal 1820 of FIG. 18 may transmit the HARQ feedback frame including the ACK sequence or the NACK sequence.

Although not shown in FIG. 18, in this embodiment, when an STF sequence or an LTF sequence is used in the HARQ feedback frame, an ACK or an NACK may be indicated by the following method.

In this case, all subcarrier tones for transmitting the STF sequence or the LTF sequence may be divided into two logical sub-tone sets (e.g., sub-tone set #1 and sub-tone set #2). Tones included in each sub-tone set may be distributed in a physical channel.

For example, a first sub-tone set (sub-tone set #1) may be a set of odd-numbered tones among all subcarrier tones for transmitting a 4×HE-LTF sequence in a transmission band.

For example, a second sub-tone set (sub-tone set #2) may be a set of even-numbered tones among all the subcarrier tones for transmitting the 4×HE-LTF sequence in the transmission band.

For example, when the ACK is indicated by the STF sequence or the LTF sequence, energy (i.e., a predefined sequence) may be transmitted only via tones belonging to one sub-tone set (e.g., sub-tone set #1) of the first sub-tone set (sub-tone set #1) and the second sub-tone set (sub-tone set #2).

For example, when the NACK is indicated by the STF sequence or the LTF sequence, energy (i.e., a predefined sequence) may be transmitted only via tones belonging to one sub-tone set (e.g., sub-tone set #2) of the first sub-tone set (sub-tone set #1) and the second sub-tone set (sub-tone set #2).

Figure 19:
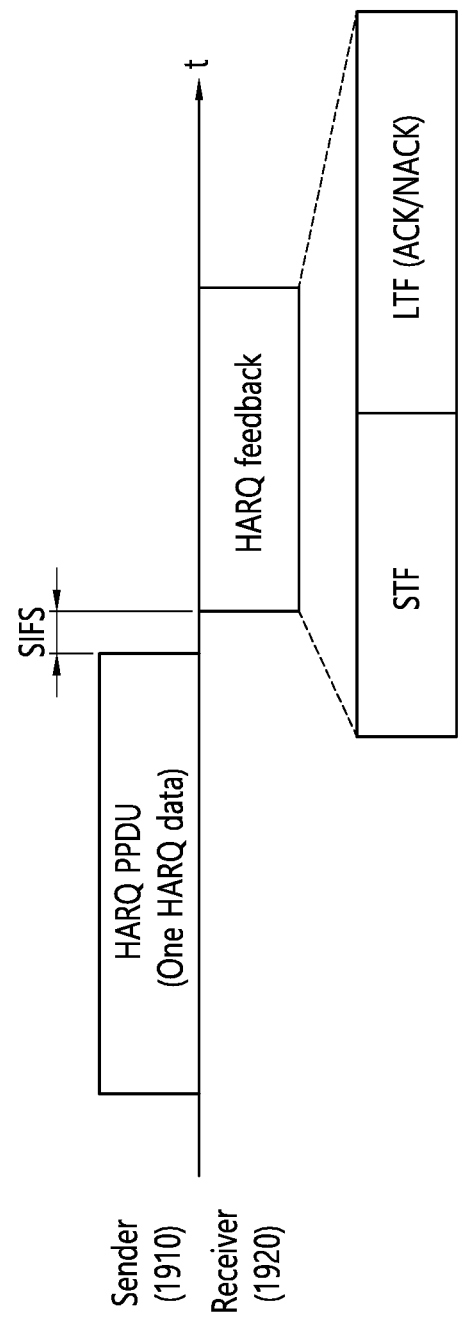
FIG. 19 illustrates a process of transmitting an HARQ feedback frame configured based on an STF and an LTF according to an embodiment.

FIG. 19 illustrates a process of transmitting an HARQ feedback frame configured based on an STF and an LTF according to an embodiment.

Referring to FIG. 17 and FIG. 19, an HARQ feedback frame of FIG. 19 may include an STF and an LTF. Here, the LTF may include ACK/NACK information.

As mentioned above, the STF may be any one of an STF and an LTF defined in 802.11.

When the STF is used, any one of an L-STF, a VHT-STF, and an HE-STF is preferably used. When the LTF is used, any one of an L-LTF, a VHT-LTF, and an HE-LTF is preferably used. However, it will be understood that this embodiment is not limited to these examples.

Combinations of an STF and an LTF that may be included in the HARQ feedback frame are illustrated below.

1) L-STF (8 us)+L-LTF (8 us)
2) VHT-STF (4 us)+VHT-LTF (4 us)
3) HE-STF (4 us/8 us)+HE-LTF (4 us/8 us/16 us)
4) L-STF (8 us)+VHT-LTF or HE-LTF

For example, when a wide bandwidth (40 MHz, 80 MHz, or 160 MHz) is used, an L-STF and an L-LTF may be transmitted in a non-HT duplication format. Here, the L-STF and the L-LTF may be selected from among L-STFs and L-LTFs defined in 802.11a/n/ac/ax.

In this embodiment, when an STF sequence or an LTF sequence is used in the HARQ feedback frame, an ACK or an NACK may be indicated by the following method.

In this case, all subcarrier tones for transmitting the STF sequence or the LTF sequence may be divided into two logical sub-tone sets (e.g., sub-tone set #1 and sub-tone set #2). Tones included in each sub-tone set may be distributed in a physical channel.

For example, a first sub-tone set (sub-tone set #1) may be a set of odd-numbered tones among all subcarrier tones for transmitting a 4×HE-LTF sequence in a transmission band.

For example, a second sub-tone set (sub-tone set #2) may be a set of even-numbered tones among all the subcarrier tones for transmitting the 4×HE-LTF sequence in the transmission band.

For example, when the ACK is indicated by the STF sequence or the LTF sequence, energy (i.e., a predefined sequence) may be transmitted only via tones belonging to one sub-tone set (e.g., sub-tone set #1) of the first sub-tone set (sub-tone set #1) and the second sub-tone set (sub-tone set #2).

For example, when the NACK is indicated by the STF sequence or the LTF sequence, energy (i.e., a predefined sequence) may be transmitted only via tones belonging to one sub-tone set (e.g., sub-tone set #2) of the first sub-tone set (sub-tone set #1) and the second sub-tone set (sub-tone set #2).

In this embodiment, when an STF sequence or an LTF sequence is used in the HARQ feedback frame, an ACK or an NACK may be indicated by a different method.

For example, when the LTF sequence is included in the HARQ feedback frame, an ACK may be indicated. Further, when a −[LTF] sequence is included in the HARQ feedback frame, an NACK may be indicated.

Figure 20:
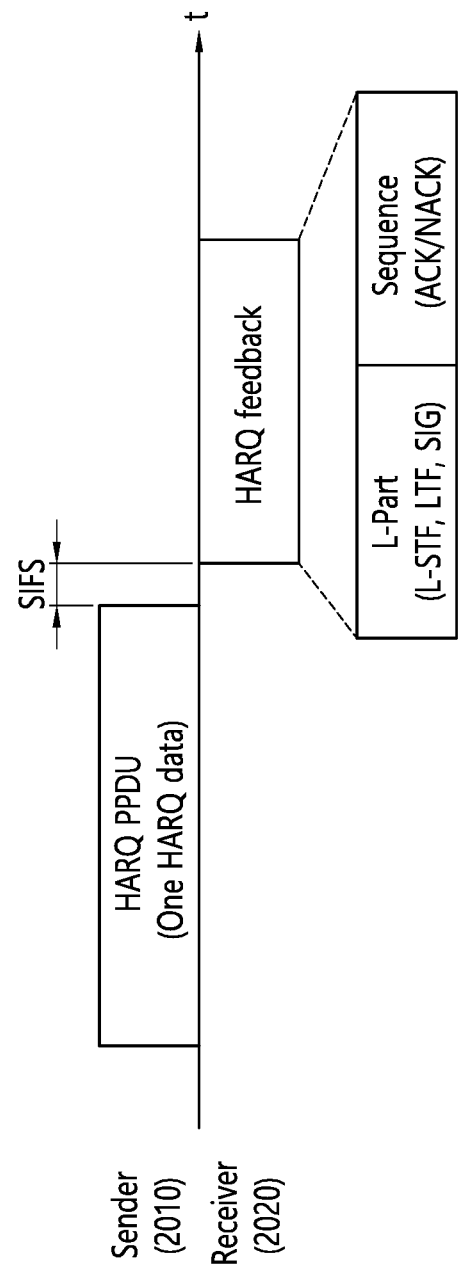
FIG. 20 illustrates a process of transmitting an HARQ feedback frame configured based on a legacy part and a predetermined sequence according to an embodiment.

FIG. 20 illustrates a process of transmitting an HARQ feedback frame configured based on a legacy part and a predetermined sequence according to an embodiment.

Referring to FIG. 17 and FIG. 20, an HARQ feedback frame of FIG. 20 may include a legacy part (hereinafter, L-part) field and a sequence related to an ACK/NACK. For example, the L-part field may include an L-STF, an L-LTF, and an L-SIG field.

When an HARQ PPDU including HARQ data of FIG. 20 is received, a receiving terminal 2020 may transmit an HARQ feedback frame including a sequence related to an ACK/NACK after SIFS. For example, the sequence related to the ACK/NACK may be an STF sequence or an LTF sequence.

According to a first method for the embodiment of FIG. 20, the HARQ feedback frame may include sequence X related to an ACK or sequence Y related to an NACK. For example, sequence X and sequence Y may be configured to be orthogonal to each other. That is, sequence Y may be complementary to sequence X.

For example, sequence Y=−sequence X. In another example, when sequence X=STF sequence or LTF sequence, sequence Y=−STF sequence or −LTF sequence.

For example, the sequence related to the ACK may be defined as (0, 1, 0, 1, 0, 1, . . . ) and the sequence related to the NACK may be defined as (1, 0, 1, 0, 1, 0, . . . ). However, it will be understood that the sequences related to the ACK/NACK are not limited to the above examples.

According to a second method for the embodiment of FIG. 20, when a known sequence (e.g., an STF sequence or LTF sequence) is used in the HARQ feedback frame, an ACK or NACK may be indicated.

In this case, all subcarrier tones for transmitting the STF sequence or the LTF sequence may be divided into two logical sub-tone sets (e.g., sub-tone set #1 and sub-tone set #2). Tones included in each sub-tone set may be distributed in a physical channel.

For example, a first sub-tone set (sub-tone set #1) may be a set of odd-numbered tones among all subcarrier tones for transmitting a 4×HE-LTF sequence in a transmission band.

For example, a second sub-tone set (sub-tone set #2) may be a set of even-numbered tones among all the subcarrier tones for transmitting the 4×HE-LTF sequence in the transmission band.

For example, when the ACK is indicated by the STF sequence or the LTF sequence, energy (i.e., a predefined sequence) may be transmitted only via tones belonging to one sub-tone set (e.g., sub-tone set #1) of the first sub-tone set (sub-tone set #1) and the second sub-tone set (sub-tone set #2).

For example, when the NACK is indicated by the STF sequence or the LTF sequence, energy (i.e., a predefined sequence) may be transmitted only via tones belonging to one sub-tone set (e.g., sub-tone set #2) of the first sub-tone set (sub-tone set #1) and the second sub-tone set (sub-tone set #2).

That is, when the receiving terminal 2020 of the HARQ feedback frame detects energy only in the tones (or subcarriers) included in the first sub-tone set (sub-tone set #1) (i.e., when energy is not detected in the tones (or subcarriers) included in the second sub-tone set (sub-tone set #2)), the receiving terminal 2020 may consider the HARQ feedback frame as an ACK.

Further, when the receiving terminal 2020 of the HARQ feedback frame detects energy only in the tones (or subcarriers) included in the second sub-tone set (sub-tone set #2) (i.e., when energy is not detected in the tones (or subcarriers) included in the first sub-tone set (sub-tone set #1)), the receiving terminal 2020 may consider the HARQ feedback frame as an NACK.

The sequences related to the ACK/NACK mentioned in FIG. 20 may include a BPSK 1 symbol or a BPSK 2 symbol, and each symbol may include any one of a 1× symbol, a 2× symbol, and a 4× symbol.

In the embodiment of FIG. 20, when an STF sequence or an LTF sequence is used in the HARQ feedback frame, an ACK or an NACK may be indicated.

For example, tones related to a 20-MHz bandwidth may be divided into two logical tone sets. In this case, energy (i.e., the LTF sequence) may be transmitted only via tones included in a first tone set in order to indicate the ACK. In addition, energy (i.e., the LTF sequence) may be transmitted only via tones included in a second tone set in order to indicate the NACK.

In another example, two different sequences (LTF or STF sequences) may be used. In this case, a first sequence may be transmitted in order to indicate an ACK. Further, a second sequence may be transmitted in order to indicate an NACK. Here, the two sequences may be configured to be orthogonal to each other.

This specification is not limited to the foregoing methods and enables an ACK or an NACK to be indicated through methods other than the foregoing methods. Although BPSK is applied as an MCS to a sequence related to an ACK/NACK, it will be understood that this specification is not limited thereto.

Although not shown in FIG. 20, the HARQ feedback frame may include only the sequence without the L-part field (i.e., L-STF, L-LTF, and L-SIG), which is more advantageous in terms of overhead than in the presence of the L-part field (i.e., L-STF, L-LTF, and L-SIG).

However, when there is no L-part field, a decoding operation by a third-party STA may not be performed. Even in this case, the HARQ feedback frame has a short length, which may not cause a serious problem.

Figure 21:
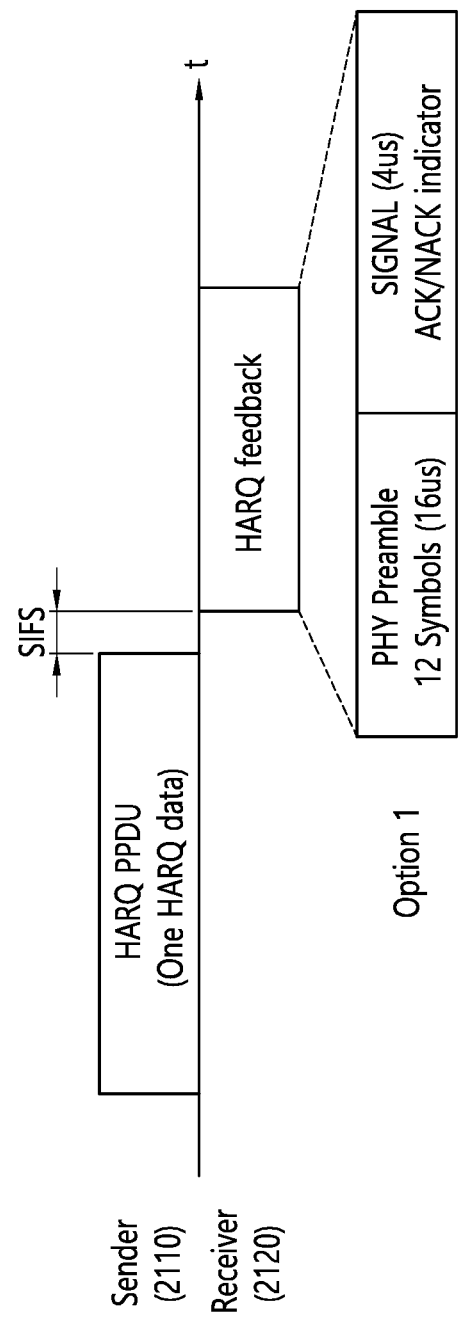
FIG. 21 illustrates a process of transmitting an HARQ feedback frame configured based on a legacy WLAN system according to an embodiment.

FIG. 21 illustrates a process of transmitting an HARQ feedback frame configured based on a legacy WLAN system according to an embodiment. For a clear and concise description of FIG. 21, an 802.11a system may be assumed.

Referring to FIG. 21, an HARQ feedback frame may include a PHY preamble (e.g., including 10 short training symbols and 2 long training symbols) and a SIGNAL field.

In a first method according to the embodiment of FIG. 21, a reserved bit of the SIGNAL field may be used to indicate an ACK (0) or an NACK (1).

In a second method according to the embodiment of FIG. 21, a specific value of a specific field of the SIGNAL field may be used to indicate an ACK (0) or an NACK (1).

For example, when the specific field of the SIGNAL field is a LENGTH field, an unused value (e.g., 0 to 11) among values of the LENGTH field may be used to indicate an ACK or an NACK.

For example, a value of 10 of the LENGTH field may indicate an ACK, and a value of 11 of the LENGTH field may indicate an NACK. In another example, two unused values may be used to indicate an ACK or an NACK instead of 10 or 11.

For example, when the specific field of the SIGNAL field is a RATE field (R1-R4), one selected from among unused values (e.g., 0000, 0010, 0100, 0110, 1000, 1010, 1100, and 1110) among values of the RATE field (R1-R4) may be used as an ACK.

Further, when the specific field of the SIGNAL field is the RATE field (R1-R4), one selected from among the unused values (e.g., 0000, 0010, 0100, 0110, 1000, 1010, 1100, and 1110) excluding the value selected as the ACK among the values of the RATE field (R1-R4) may be used as an NACK.

For example, a value of 1110 (R1-R4) of the RATE field (R1-R4) may indicate an ACK, and a value of 0110 (R1-R4) of the RATE field (R1-R4) may indicate an NACK.

Figure 22:
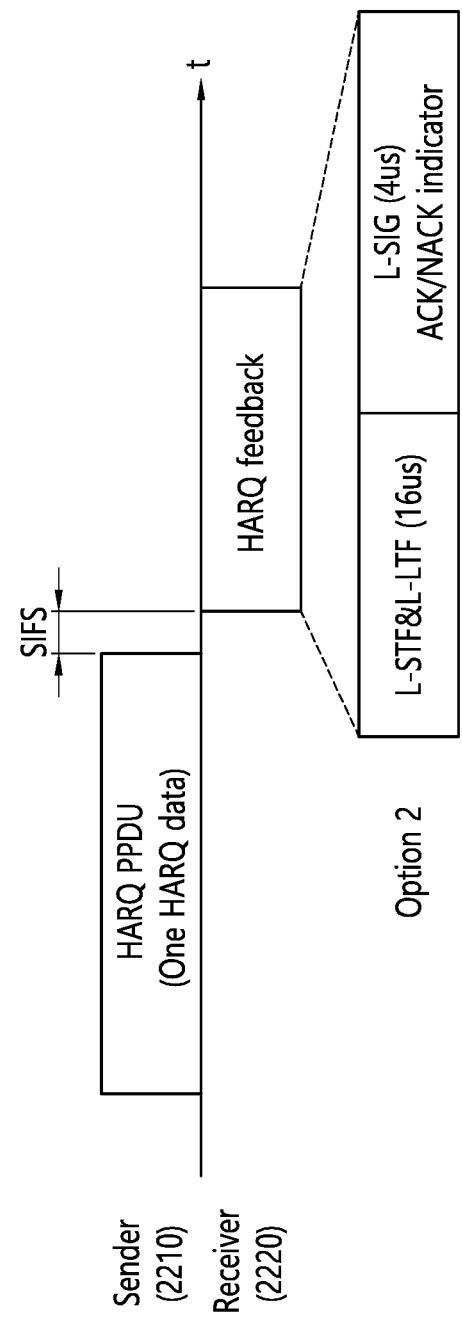
FIG. 22 illustrates a process of transmitting an HARQ feedback frame configured based on an HE WLAN system according to an embodiment.

FIG. 22 illustrates a process of transmitting an HARQ feedback frame configured based on an HE WLAN system according to an embodiment. For a clear and concise description of FIG. 22, an HE WLAN system may be assumed.

Referring to FIG. 22, an HARQ feedback frame may include an L-STF, an L-LTF, and an L-SIG field. For example, the L-SIG field may include ACK/NACK information.

In a first method according to the embodiment of FIG. 22, a reserved bit of the SIGNAL field may be used to indicate an ACK (0) or an NACK (1).

In a second method according to the embodiment of FIG. 22, a specific value of a specific field of the SIGNAL field may be used to indicate an ACK (0) or an NACK (1).

For example, when the specific field of the SIGNAL field is a LENGTH field, an unused value (e.g., 0 to 11) among values of the LENGTH field may be used to indicate an ACK or an NACK.

For example, a value of 10 of the LENGTH field may indicate an ACK, and a value of 11 of the LENGTH field may indicate an NACK. In another example, two unused values may be used to indicate an ACK or an NACK instead of 10 or 11.

For example, when the specific field of the SIGNAL field is a RATE field (R1-R4), one selected from among unused values (e.g., 0000, 0010, 0100, 0110, 1000, 1010, 1100, and 1110) among values of the RATE field (R1-R4) may be used as an ACK.

Further, when the specific field of the SIGNAL field is the RATE field (R1-R4), one selected from among the unused values (e.g., 0000, 0010, 0100, 0110, 1000, 1010, 1100, and 1110) excluding the value selected as the ACK among the values of the RATE field (R1-R4) may be used as an NACK.

For example, a value of 1110 (R1-R4) of the RATE field (R1-R4) may indicate an ACK, and a value of 0110 (R1-R4) of the RATE field (R1-R4) may indicate an NACK.

It will be appreciated that the embodiment mentioned in FIG. 22 may be applied not only to the HE WLAN system but also to an HT WLAN system and a VHT WLAN system.

Figure 23:
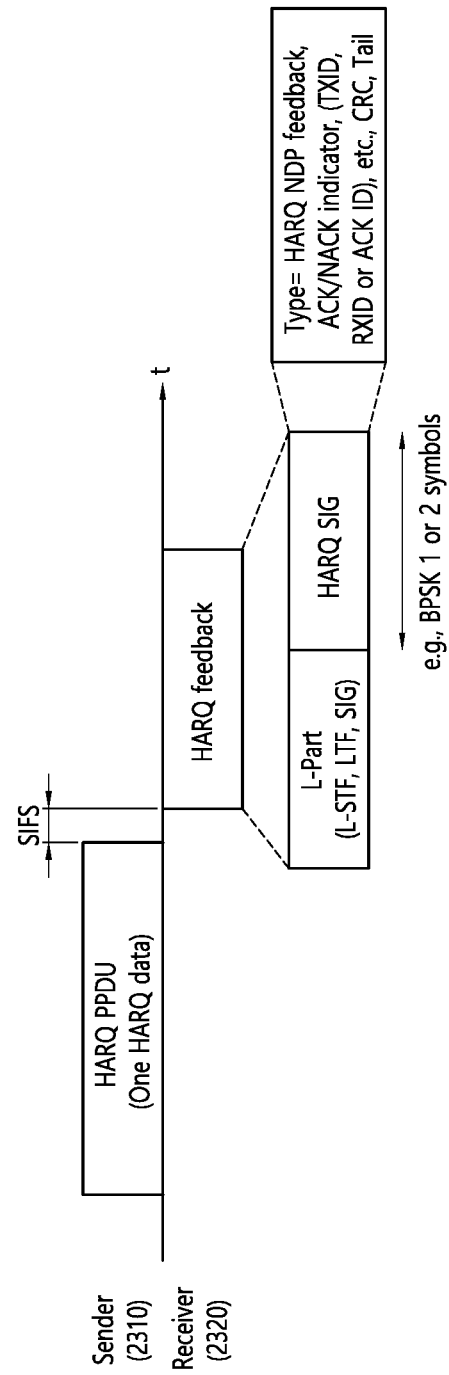
FIG. 23 illustrates a process of transmitting an HARQ feedback frame based on a legacy part and an HARQ SIG field according to an embodiment.

FIG. 23 illustrates a process of transmitting an HARQ feedback frame based on a legacy part and an HARQ SIG field according to an embodiment.

Referring to FIG. 17 and FIG. 23, an HARQ feedback frame in response to an HARQ PPDU may include an L-part field and an HARQ SIG field. For example, a Type field included in the HARQ SIG field may be configured to indicate HARQ NDP feedback.

For example, the HARQ SIG field may include an ACK/NACK indicator (0: ACK and 1: NACK). Further, the HARQ SIG field may include one or more of transmitter ID information, receiver ID information, and ACK ID information.

For example, when transmitter ID information or receiver ID information is included in the HARQ SIG field, a transmitting entity and a receiving entity of the HARQ frame may be determined.

Unlike in FIG. 23, the HARQ feedback frame may include only the L-part field (i.e., L-STF, L-LTF, and L-SIG). In this case, the HARQ feedback frame has a shorter frame length than that including an L-part field and a sequence (or HARQ-SIG), but it will be understood that a value of an L-SIG field needs to be newly defined.

Figure 24:
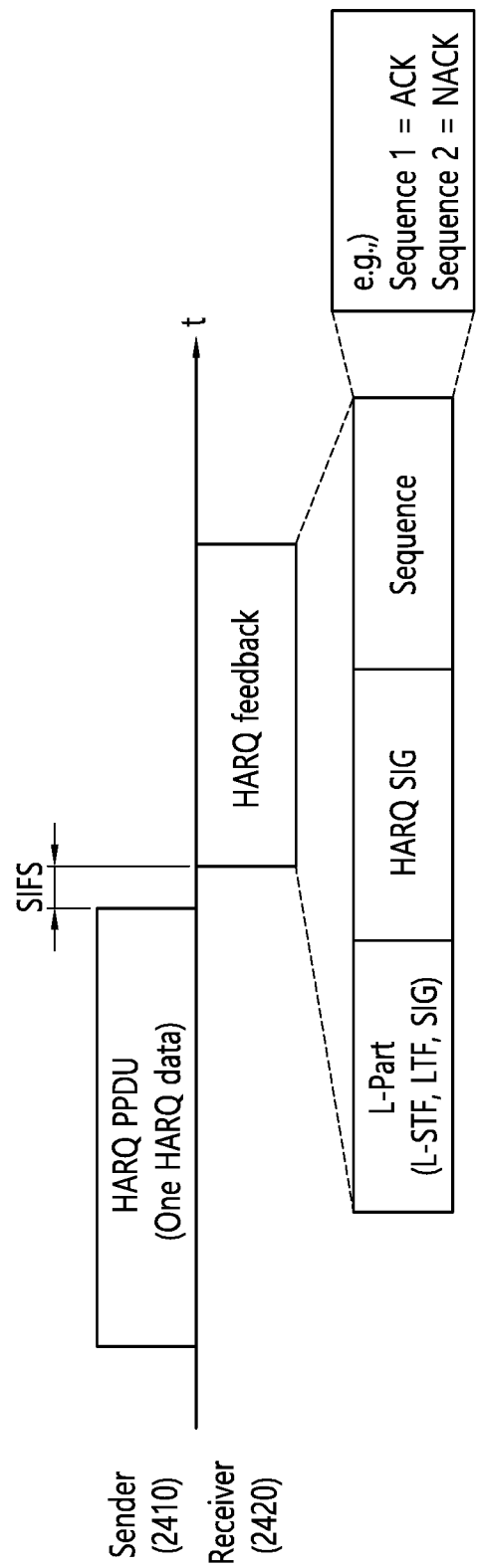
FIG. 24 illustrates a process of transmitting an HARQ feedback frame configured based on a legacy part, an HARQ SIG field, and a preset sequence according to an embodiment.

FIG. 24 illustrates a process of transmitting an HARQ feedback frame configured based on a legacy part, an HARQ SIG field, and a preset sequence according to an embodiment.

Referring to FIG. 17 and FIG. 24, an HARQ SIG field may be disposed before a preset sequence. Here, the preset sequence may include ACK/NACK information.

For example, when the preset sequence includes a first sequence, an HARQ feedback frame may be used to indicate the ACK information. When the preset sequence includes a second sequence, the HARQ feedback frame may be used to indicate the NACK information.

Figure 25:
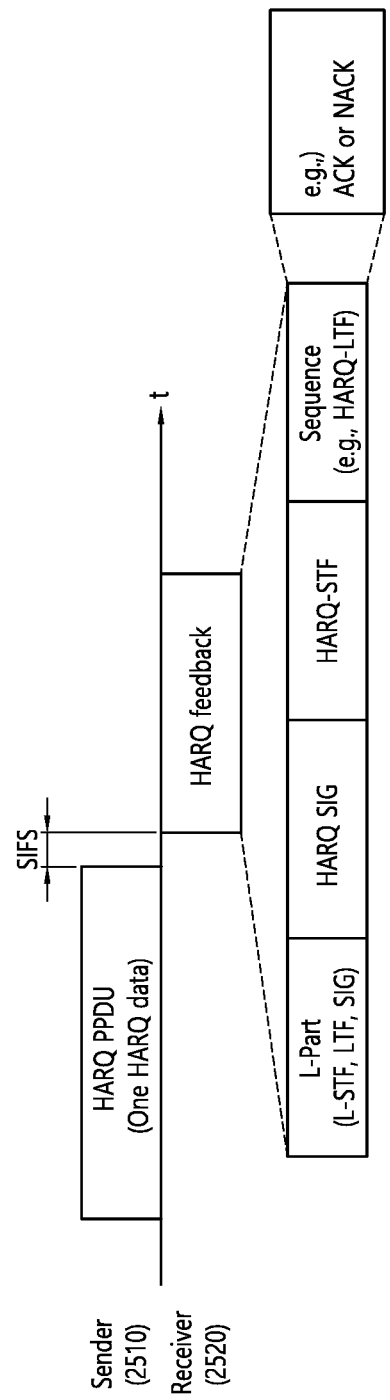
FIG. 25 illustrates a process of transmitting an HARQ feedback frame based on a legacy part, an HARQ SIG field, an HARQ STF field, and a preset sequence according to an embodiment.

FIG. 25 illustrates a process of transmitting an HARQ feedback frame based on a legacy part, an HARQ SIG field, an HARQ STF field, and a preset sequence according to an embodiment.

In an HARQ feedback frame for an HARQ PPDU of FIG. 25, an HARQ-SIG field, an HARQ-STF, and an HARQ-LTF may be disposed after an L-part field.

For example, the HARQ-LTF may indicate ACK information or NACK information. In this case, the HARQ-LTF may be construed as reusing a newly introduced sequence or an existing 4×HE-LTF.

Referring to FIG. 17 and FIG. 25, to indicate ACK information or NACK information based on an HARQ-LTF sequence of FIG. 25, all subcarrier tones for transmitting the HARQ-LTF sequence may be divided into two logical sub-tone sets (e.g., sub-tone set #1 and sub-tone set #2). In this case, tones included in each sub-tone set may be distributed in a physical channel.

For example, a first sub-tone set (sub-tone set #1) may be a set of odd-numbered tones among all subcarrier tones for transmitting a 4×HE-LTF sequence in a transmission band.

For example, a second sub-tone set (sub-tone set #2) may be a set of even-numbered tones among all the subcarrier tones for transmitting the 4×HE-LTF sequence in the transmission band.

For example, when an ACK is indicated by an STF sequence or an LTF sequence, energy (i.e., a predefined sequence) may be transmitted only via tones belonging to one sub-tone set (e.g., sub-tone set #1) of the first sub-tone set (sub-tone set #1) and the second sub-tone set (sub-tone set #2).

For example, when an NACK is indicated by an STF sequence or an LTF sequence, energy (i.e., a predefined sequence) may be transmitted only via tones belonging to one sub-tone set (e.g., sub-tone set #2) of the first sub-tone set (sub-tone set #1) and the second sub-tone set (sub-tone set #2).

According to another method, the HARQ-LTF sequence of FIG. 25 may be used as ACK information, and a −[HARQ-LTF] sequence may be used as NACK information. FIG. 25 shows only one example, and it will be appreciated that an ACK or an NACK may be indicated using other methods mentioned through FIG. 25.

Figure 26:
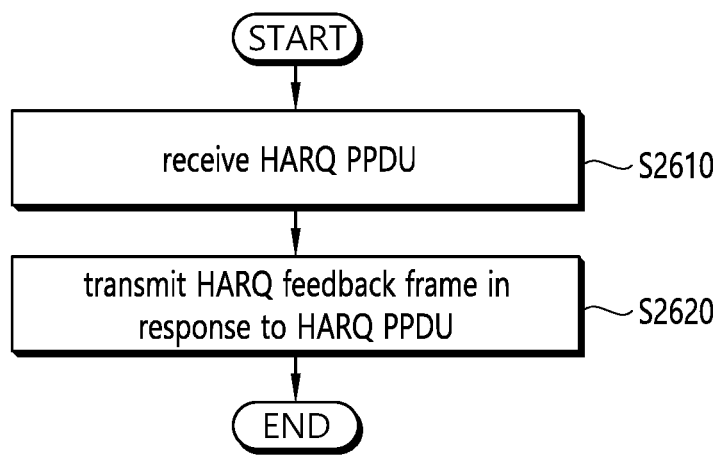
FIG. 26 is a flowchart illustrating a method for supporting an HARQ process in a WLAN system from the viewpoint of a receiving terminal of HARQ data.

FIG. 26 is a flowchart illustrating a method for supporting an HARQ process in a WLAN system from the viewpoint of a receiving terminal of HARQ data.

For a clear and concise understanding of FIG. 26, a first wireless terminal mentioned in FIG. 26 may be understood as a receiving terminal of HARQ data, and a second wireless terminal may be understood as a transmitting terminal of the HARQ data.

Referring to FIG. 1 to FIG. 26, in step S2610, the first wireless terminal may receive an HARQ physical layer protocol data unit (PPDU) including HARQ data from the second wireless terminal.

In step S2620, the first wireless terminal may transmit an HARQ feedback frame in response to the HARQ PPDU to the second wireless terminal. For example, after a lapse of a predetermined time (i.e., SIFS) from reception of the HARQ PPDU, the first wireless terminal may transmit the HARQ feedback frame.

For example, the HARQ feedback frame may include a first field related to a PHY preamble and a second field related to acknowledgment (ACK) information or negative acknowledgment (NACK) information based on whether the HARQ data is successfully received.

For example, when the HARQ data is successfully received, a first value may be set in the second field of the HARQ feedback frame. When an error is included in the HARQ data, a second value may be set in the second field of the HARQ feedback frame.

For example, when an 802.11a system is applied to the WLAN system, the first field of the HARQ feedback frame may include 10 short training symbols and 2 long training symbols, and the second field may include a SIGNAL field.

For example, when an HE system is applied to the WLAN system, the first field of the HARQ feedback frame may include an L-STF and an L-LTF, and the second field of the HARQ feedback frame may include an L-SIG field.

Figure 27:
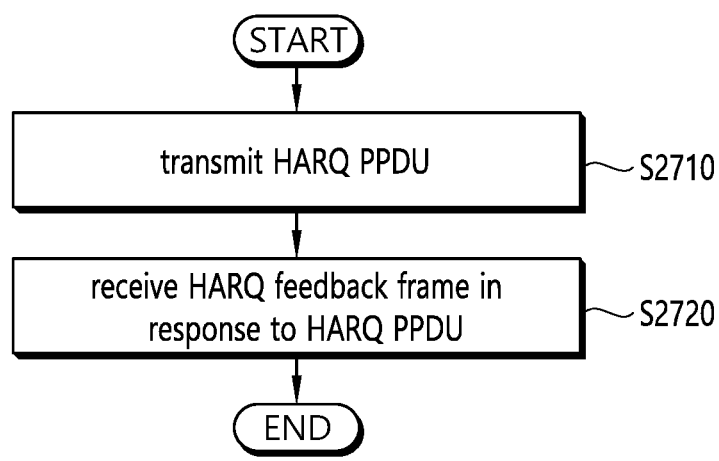
FIG. 27 is a flowchart illustrating a method for supporting an HARQ process in a WLAN system from the viewpoint of a transmitting terminal of HARQ data.

FIG. 27 is a flowchart illustrating a method for supporting an HARQ process in a WLAN system from the viewpoint of a transmitting terminal of HARQ data.

For a clear and concise understanding of FIG. 27, a first wireless terminal mentioned in FIG. 27 may be understood as a transmitting terminal of HARQ data, and a second wireless terminal may be understood as a receiving terminal of the HARQ data.

Referring to FIG. 1 to FIG. 27, in step S2710, the first wireless terminal may transmit an HARQ physical layer protocol data unit (PPDU) including HARQ data to the second wireless terminal.

In step S2720, the first wireless terminal may receive an HARQ feedback frame in response to the HARQ PPDU from the second wireless terminal.

For example, the HARQ feedback frame may include a first field related to a PHY preamble and a second field related to acknowledgment (ACK) information or negative acknowledgment (NACK) information based on whether the HARQ data is successfully received.

For example, when the HARQ data is successfully received, a first value may be set in the second field of the HARQ feedback frame. When an error is included in the HARQ data, a second value may be set in the second field of the HARQ feedback frame.

For example, when an 802.11a system is applied to the WLAN system, the first field of the HARQ feedback frame may include 10 short training symbols and 2 long training symbols, and the second field may include a SIGNAL field.

For example, when an HE system is applied to the WLAN system, the first field of the HARQ feedback frame may include an L-STF and an L-LTF, and the second field of the HARQ feedback frame may include an L-SIG field.

Figure 28:
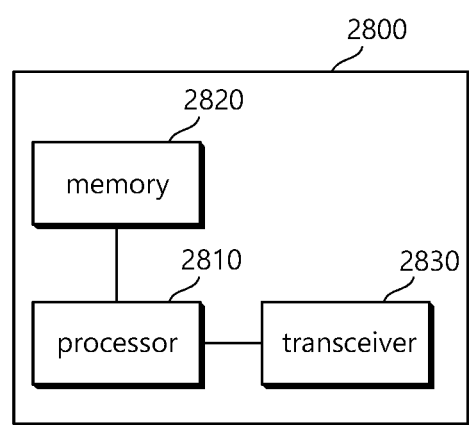
FIG. 28 is a block diagram illustrating a wireless device to which the embodiments are applicable.

FIG. 28 is a block diagram illustrating a wireless device to which the embodiments are applicable.

Referring to FIG. 28, the wireless device may be an STA capable of implementing the foregoing embodiments, which may be an AP or a non-AP STA. Further, the wireless device may correspond to the foregoing user or a transmitting terminal that transmits a signal to a user.

As illustrated in FIG. 28, the wireless device includes a processor 2810, a memory 2820, and a transceiver 2830. The processor 2810, the memory 2820, and the transceiver 2830 may be configured as separate chips or as a single chip having at least two blocks/functions.

The transceiver 2830 may be a device including a transmitter and a receiver. When a particular operation is performed only any one of the transmitter and the receiver may operate or both the transmitter and the receiver may operate.

The transceiver 2830 may include one or more antennas for transmitting and/or receiving a radio signal. Further, the transceiver 2830 may include an amplifier for amplifying a reception signal and/or a transmission signal and a band-pass filter for transmission on a particular frequency band.

The processor 2810 may implement the functions, processes, and/or methods proposed in the present specification. For example, the processor 2810 may perform operations according to the aforementioned embodiments. That is, the processor 2810 may perform operations disclosed in the embodiments of FIG. 1 to FIG. 27.

The processor 2810 may include an application-specific integrated circuit (ASIC), other chipsets, a logic circuit, a data processor, and/or a converter to convert a baseband signal and a radio signal from one to the other.

The memory 2820 may include a read-only memory (ROM), a random access memory (RAM), a flash memory, a memory card, a storage medium, and/or other storage devices.

FIG. 29 is a block diagram illustrating an example of a device included in a processor.

Although the example illustrated in FIG. 29 is described with reference to blocks for a transmission signal for convenience of description, it is obvious that the same blocks may be used to process a reception signal.

A data processing unit 2910 generates transmission data (control data and/or user data) corresponding to a transmission signal. An output from the data processing unit 2910 may be input to an encoder 2920. The encoder 2920 may perform coding using a binary convolutional code (BCC) or a low-density parity-check (LDPC) technique. At least one encoder 2920 may be included, and the number of encoders 2920 may be determined depending on various pieces of information (e.g., the number of data streams).

An output from the encoder 2920 may be input to an interleaver 2930. The interleaver 2930 performs an operation of distributing consecutive bit signals on radio resources (e.g., time and/or frequency) in order to prevent burst errors due to fading. At least one interleaver 2930 may be included, and the number of interleavers 2930 may be determined depending on various pieces information (e.g., the number of spatial streams).

An output from the interleaver 2930 may be input to a constellation mapper 2940. The constellation mapper 2940 may perform constellation mapping, such as biphase shift keying (BPSK), quadrature phase shift keying (QPSK), and n-quadrature amplitude modulation (n-QAM).

An output from the constellation mapper 2940 may be input to a spatial stream encoder 2950. The spatial stream encoder 2950 may perform data processing to transmit a transmission signal through at least one spatial stream. For example, the spatial stream encoder 2950 may perform at least one of space-time block coding (STBC), cyclic shift diversity (CSD) insertion, and spatial mapping on a transmission signal.

An output from the spatial stream encoder 2950 may be input to a IDFT block 2960. The IDFT block 2960 may perform inverse discrete Fourier transform (IDFT) or inverse fast Fourier transform (IFFT).

An output from the IDFT block 2960 may be input to a guard interval (GI) inserter 2970, and an output from the GI inserter 2970 may be input to the transceiver 2130 of FIG. 28.

Although specific embodiments have been described in detail in the present specification, various modifications are possible without departing from the scope of the present specification. Therefore, the scope of the present specification should not be construed as being limited to the aforementioned embodiments but should be defined by not only the appended claims described below but also equivalents to the claims.

What is claimed is:

1. A method for communicating in a wireless local area network (WLAN) system, the method comprising:
  receiving, by a first wireless terminal from a second wireless terminal, a first physical layer protocol data unit (PPDU) comprising a data field;
  determining, by the first wireless terminal, whether the data field is successfully received; and
  configuring, by the first wireless terminal, a second PPDU in response to the first PPDU,
  wherein the second PPDU includes a legacy part, a control signal field, and a training field,
  wherein the legacy part includes a legacy-Short Training Field (L-STF), a legacy-Long Training Field (L-LTF), and a legacy-Signal Field (L-SIG),
  wherein the control signal field includes control information related to the second PPDU,
  wherein the second PPDU has a bandwidth of 20 MHz,
  wherein the training field is configured based on one of a first long training field (LTF) sequence and a second LTF sequence based on whether the data field of the first PPDU is successfully received,
  wherein each of the first LTF sequence and the second LTF sequence is positioned starting from a lowest tone having a tone index of −122 and ending at a highest tone having a tone index of +122,
  wherein non-zero elements of the first LTF sequence are positioned in a first tone set and non-zero elements of the second LTF sequence are positioned in a second tone set not overlapping with the first tone set.

2. The method of claim 1, wherein the training field is configured based on the first LTF sequence for the data field being successfully received.

3. The method of claim 1, wherein the training field is configured based on the second LTF sequence for the data field not being successfully received.

4. The method of claim 1, wherein the non-zero elements of the first LTF sequence are positioned in odd-numbered tones.

5. The method of claim 1, wherein the non-zero elements of the second LTF sequence are positioned in even-numbered tones.

6. The method of claim 1, wherein the data field of the first PPDU is configured based on a hybrid automatic repeat request (HARD) process.

7. The method of claim 1, wherein the first wireless terminal is a user station (STA) or an access point (AP) STA.

8. A first wireless terminal in a wireless local area network (WLAN) system, the first wireless terminal comprising:
a memory; and
a processor operatively coupled to the memory,
wherein the processor is configured to:
receive a first physical layer protocol data unit (PPDU) comprising a data field from a second wireless terminal;
determine whether the data field is successfully received; and
configure a second PPDU in response to the first PPDU,
wherein the second PPDU includes a legacy part, a control signal field, and a training field,
wherein the legacy part includes a legacy-Short Training Field (L-STF), a legacy-Long Training Field (L-LTF), and a legacy-Signal Field (L-SIG),
wherein the control signal field includes control information related to the second PPDU,
wherein the second PPDU has a bandwidth of 20 MHz,
wherein the training field is configured based on one of a first long training field (LTF) sequence and a second LTF sequence based on whether the data field of the first PPDU is successfully received,
wherein each of the first LTF sequence and the second LTF sequence is positioned starting from a lowest tone having a tone index of −122 and ending at a highest tone having a tone index of +122,
wherein non-zero elements of the first LTF sequence are positioned in a first tone set and non-zero elements of the second LTF sequence are positioned in a second tone set not overlapping with the first tone set.

9. The first wireless terminal of claim 8, wherein the training field is configured based on the first LTF sequence for the data field being successfully received.

10. The first wireless terminal of claim 8, wherein the training field is configured based on the second LTF sequence for the data field not being successfully received.

11. The first wireless terminal of claim 8, wherein the non-zero elements of the first LTF sequence are positioned in odd-numbered tones.

12. The first wireless terminal of claim 8, wherein the non-zero elements of the second LTF sequence are positioned in even-numbered tones.

13. The first wireless terminal of claim 8, wherein the data field of the first PPDU is configured based on a hybrid automatic repeat request (HARD) process.

14. The first wireless terminal of claim 8, wherein the first wireless terminal is a user station (STA) or an access point (AP) STA.

* * * * *